(12) United States Patent
Melnychenko et al.

(10) Patent No.: US 8,898,705 B2
(45) Date of Patent: Nov. 25, 2014

(54) SYSTEM AND METHODS FOR MODIFYING IMPROPERLY FORMATTED METADATA

(75) Inventors: Mark Melnychenko, Avondale, PA (US); Paul George Milazzo, Hockessin, DE (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/432,932

(22) Filed: Mar. 28, 2012

(65) Prior Publication Data

US 2013/0263184 A1    Oct. 3, 2013

(51) Int. Cl.
*G06F 3/00* (2006.01)
*G06F 13/00* (2006.01)
*H04N 5/445* (2011.01)

(52) U.S. Cl.
USPC ............. 725/50; 725/44; 725/51; 725/115

(58) Field of Classification Search
USPC ..................... 725/44, 50–51, 115
See application file for complete search history.

(56) References Cited

U.S. PATENT DOCUMENTS

| | | | |
|---|---|---|---|
| 6,853,725 B2 * | 2/2005 | Levitan ................. | 379/393 |
| 6,853,728 B1 * | 2/2005 | Kahn et al. ............. | 380/239 |
| 2008/0155602 A1 * | 6/2008 | Collet et al. ............ | 725/46 |
| 2012/0210342 A1 * | 8/2012 | Gonzalez et al. ........ | 725/25 |

* cited by examiner

*Primary Examiner* — Pankaj Kumar
*Assistant Examiner* — Charles N Hicks
(74) *Attorney, Agent, or Firm* — Ropes & Gray LLP

(57) ABSTRACT

Systems and methods are provided for modifying metadata associated with content that is improperly formatted. In one configuration a metadata pre-processor receives metadata from a remote source, determines whether the received metadata is properly formatted, and, if it is not, modifies the metadata based on information received from a second remote source. In one configuration the modified metadata is then used to identify information associated with the content.

28 Claims, 14 Drawing Sheets

```
600
602 <Data_Structure>
604   <Header>
606     <Provider="InDemand"/>
608     <Data_Structure_Name="The_Titanic"/>
610     <Provider_ID="indemand.com"/>
612     <Description="The Titanic Movie InDemand"/>                    ⎫
614     <Content_ID="UNVA2001081701004001"/>                            ⎬ 694
616     <Data Structure Type="Provider Content Tier" Value="InDemand1"/>⎪
618     <Data_Structure_Format=CableLabsVOD1.1"/>                       ⎭
      </Header>
620   <Metadata>
622     <Header>
624       <Metadata_Name="The_Titanic_Guide_Listing"/>                  ⎫
626       <Description=" The Titanic title metadata "/>                 ⎪
628       <Content_ID=" UNVA2001081701004001"/>                         ⎬ 696
630       <Metadata Type="content info"/>                               ⎪
632       <Metadata_Format=CableLabsVOD1.1"/>                           ⎭
        </Header>
634     <Field_Name="Title_Brief" Value="Titanic"/>
636     <Field_Name="Title" Value="The Titanic"/>
638     <Field_Name="ISAN" Value="1881-66C7-3420-000-7-9F3A-02450-U"/>
640     <Field_Name="Episode_Name" Value="Collision with Destiny"/>
642     <Field_Name="Episode_ID" Value="S01EP01"/>
644     <Field_Name="Summary Short" Value="Big ship hits iceberg, guy dies"/>
646     <Field_Name="Rating" Value="R"/>
648     <Field_Name="Actors" Value="Winslet,Kate"/>
650     <Field_Name="Actors" Value="DiCaprio,Leonardo"/>
652     <Field Name="Category" Value="InDemand/Movies A-Z"/>
654     <Field_Name="Genre" Value="Drama"/>
656     <Field_Name="Show Type" Value="Movie"/>
658     <Field_Name="Chapter" Value="00:00:02:00,Opening Scene"/>
660     <Field_Name="Chapter" Value="00:15:12:00,They Meet"/>
662     <Field_Name="Chapter" Value="02:03:06:00,The Collision"/>
664     <Field_Name="Billing_ID" Value="56789"/>
666     <Field_Name=" Time_Available" Value="2002-02-01,2002-02-28,5"/>
      </Metadata>
668   <Metadata>
669     <Header>
670       <Metadata_Name="The_Titanic.mpg"/>                            ⎫
671       <Description="The Titanic Movie"/>                            ⎪
672       <Content_ID="UNVA2001081701004001"/>                          ⎬ 698
674       <Metadata_Type="file info"/>                                  ⎪
676       <Metadata_Format="CableLabsVOD1.1"/>                          ⎭
        </Header>
678     <Field_Name="Encryption" Value="N"/>
680     <Field_Name="Audio_Type" Value="Dolby Digital"/>
682     <Field_Name="Screen_Format" Value="Widescreen"/>
684     <Field_Name="Content_FileSize" Value="3907840"/>
      </Metadata>
686   <Content="The_Titanic.mpg"/>
    </Data_Structure>
```

FIG. 6

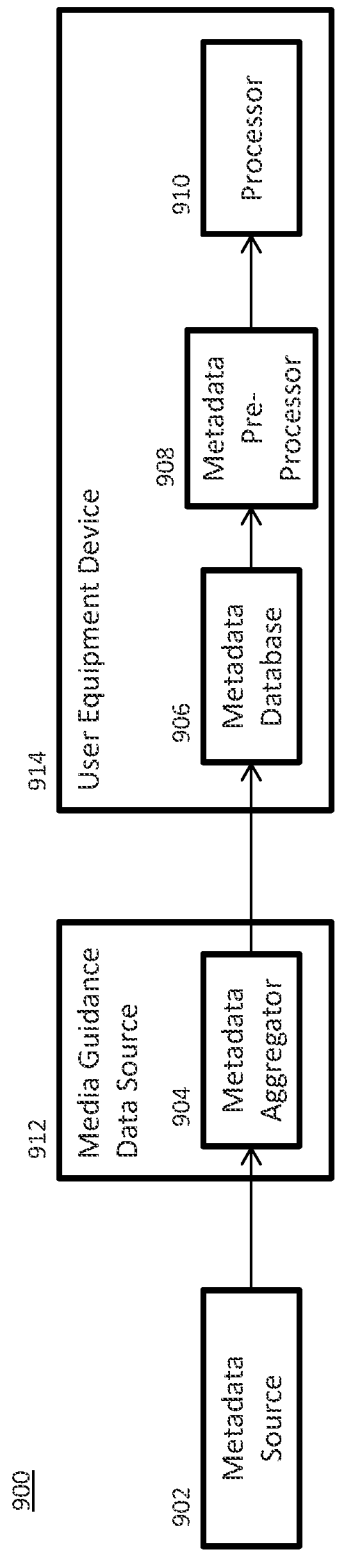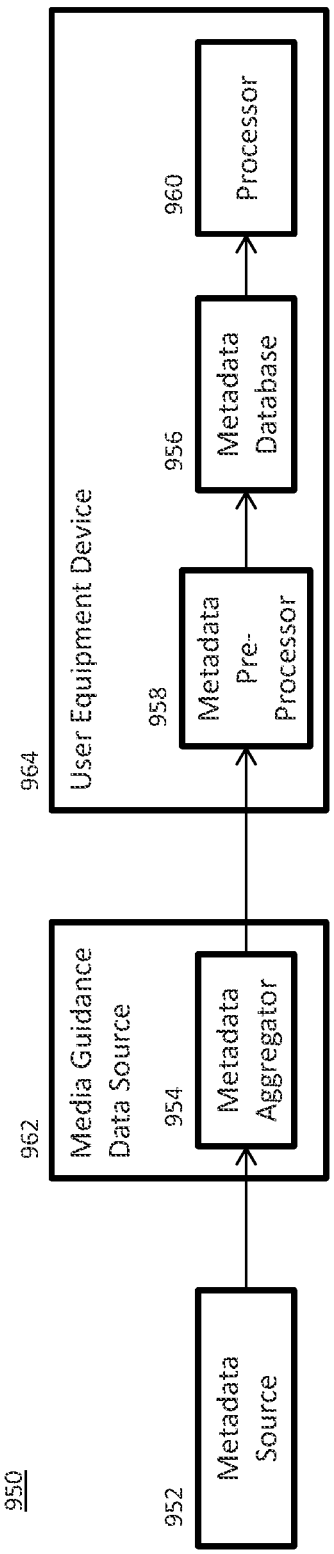

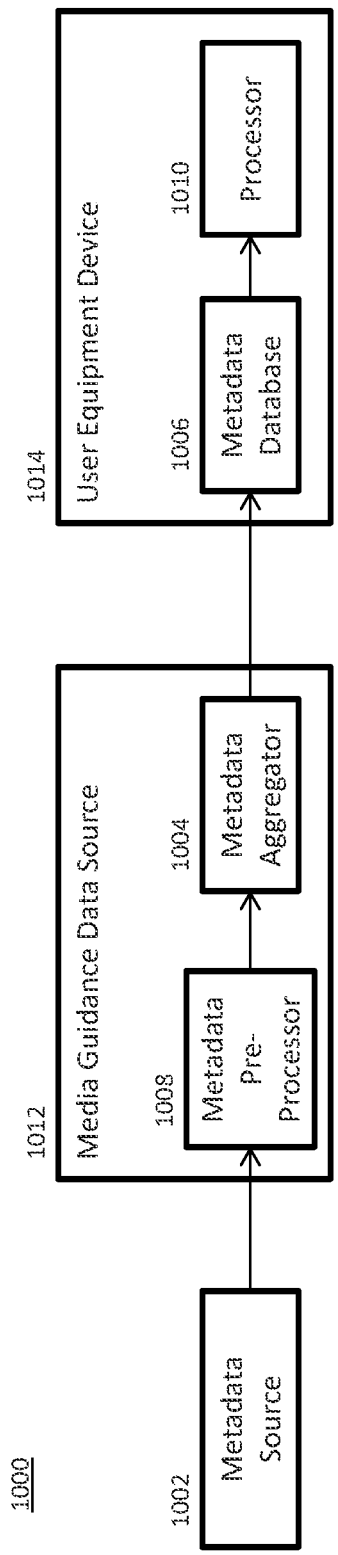
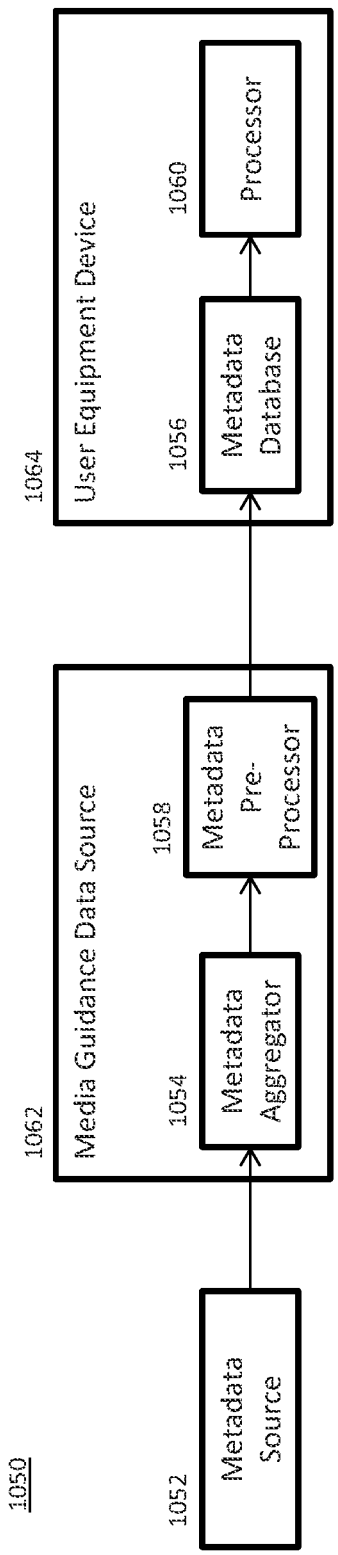

SYSTEM AND METHODS FOR MODIFYING IMPROPERLY FORMATTED METADATA

BACKGROUND

User equipment devices capable of displaying, playing or otherwise providing content to a user frequently receive not just the content, but also metadata associated with the content. This metadata may contain information regarding the substance of the content, how the content was received, how it is to be displayed, or any other potentially useful information related to the content. Metadata can thus aid a user in deciding what content to watch, provide the user equipment device with instructions on actions to take with the content, or contain data that is monitored by the user equipment device.

The metadata is generally received in a specific metadata format, and the user equipment device may need to be aware of this format to properly utilize the metadata. The metadata format may be a proprietary standard or an industry standard, a format used by a single manufacturer or by every manufacturer of similar equipment. These formats can generally be thought of as instructions for interpreting metadata. A metadata format may include definitions for individual fields or tags, the size of the metadata itself or components thereof, and how the metadata is to be decrypted and processed.

Processes or features that utilize the metadata may also require the metadata to be in a particular format. Similarly to the metadata format above, these process specific formats may set requirements on what information should be located in individual fields and how this information is to be formatted. Metadata may need to comply with a process specific format for the process or feature to execute correctly.

A provider of metadata may also format metadata for a specific purpose in a manner that is contrary to the metadata format and/or fails to comply with a process specific format, thereby rendering the metadata unsatisfactory for other purposes. If the metadata does not meet the requirements set forth by the metadata format, a process specific format, or both, the metadata may be considered improperly formatted. For example, received metadata may contain a shortened version of the title of the content it relates to instead of the full title. An editor at the metadata provider may have replaced the full title of the content with the shortened version in order for the displayed title to better fit within program guide listings. However, a process for searching for other content based on titles found in metadata may require the full title of the content in order to perform the search correctly. Therefore, the received metadata may fail to comply with the process specific format of the search process and thus be improperly formatted for performing the search.

SUMMARY

In view of the foregoing, the application, in various implementations, provides systems, methods and devices for modifying metadata associated with content that is improperly formatted. In one configuration a metadata pre-processor receives metadata from a remote source, determines whether the received metadata is properly formatted, and, if it is not, modifies the metadata based on information received from a second remote source. In one configuration the modified metadata is then used to identify information associated with the content.

In one configuration the received metadata contains a program guide listing, in which case modifying the metadata entails modifying the program guide listing. In one configuration, the modified program guide listings may be used to generate a program guide for display.

In one configuration the received title of the content the metadata relates to is modified to match a standardized title for this content.

In one configuration a proper format for the metadata is identified by cross-referencing an identifier of the metadata with a database of formats.

In one configuration the received metadata includes incomplete data, in which case modifying the metadata entails adding information to supplement the incomplete data.

In one configuration the received metadata contains information located in the wrong field, in which case modifying the metadata entails moving the information to another field.

In one configuration the received metadata may be modified based on information received from a website.

In one configuration the received metadata contains a shortened version of the title of the content instead of the full title. In this configuration a metadata pre-processor determines that the title in the metadata is not the full title, and modifies the metadata to include the full title. In this configuration the full title is then utilized to search for further information associated with the content.

In one configuration the provider of the metadata inserts a shortened title into the metadata in order for the title to look nice when the metadata is used to generate a display. In this configuration a user may also select a feature that searches for further information associated with the content based on the title found within the metadata. In this configuration the search feature causes a metadata pre-processor to determine whether the title in the metadata is the full title of the content and, if it is not, to provide the full title to the search feature. In this configuration the full title is then utilized by the search feature to search for further information associated with the content.

Various advantages and applications for modifying metadata associated with content that is improperly formatted in accordance with principles of the present disclosure are discussed in more detail below.

BRIEF DESCRIPTION OF THE DRAWINGS

The above and other features of the present application, its nature and various advantages will become more apparent upon consideration of the following detailed description, taken in conjunction with the accompanying drawings, in which like reference characters refer to like parts throughout, and in which:

FIG. 6 shows illustrative metadata in accordance with some embodiments of the invention;

FIG. 9A and FIG. 9B show illustrative systems, containing a metadata pre-processor at a user equipment device, in accordance with some embodiments of the invention;

FIG. 10A and FIG. 10B show illustrative systems, containing a metadata pre-processor at a media guidance data source, in accordance with some embodiments of the invention;

DETAILED DESCRIPTION OF EMBODIMENTS

Figure 1:
FIGS. 1 and 2 show illustrative display screens that may be used to provide media guidance application listings in accordance with some embodiments of the invention.

The application, in various implementations, provides systems, methods and devices for modifying metadata associated with content that is improperly formatted. In one configuration a metadata pre-processor receives metadata from a remote source, determines whether the received metadata is properly formatted, and, if it is not, modifies the metadata based on information received from a second remote source. In one configuration the modified metadata is then used to identify information associated with the content.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
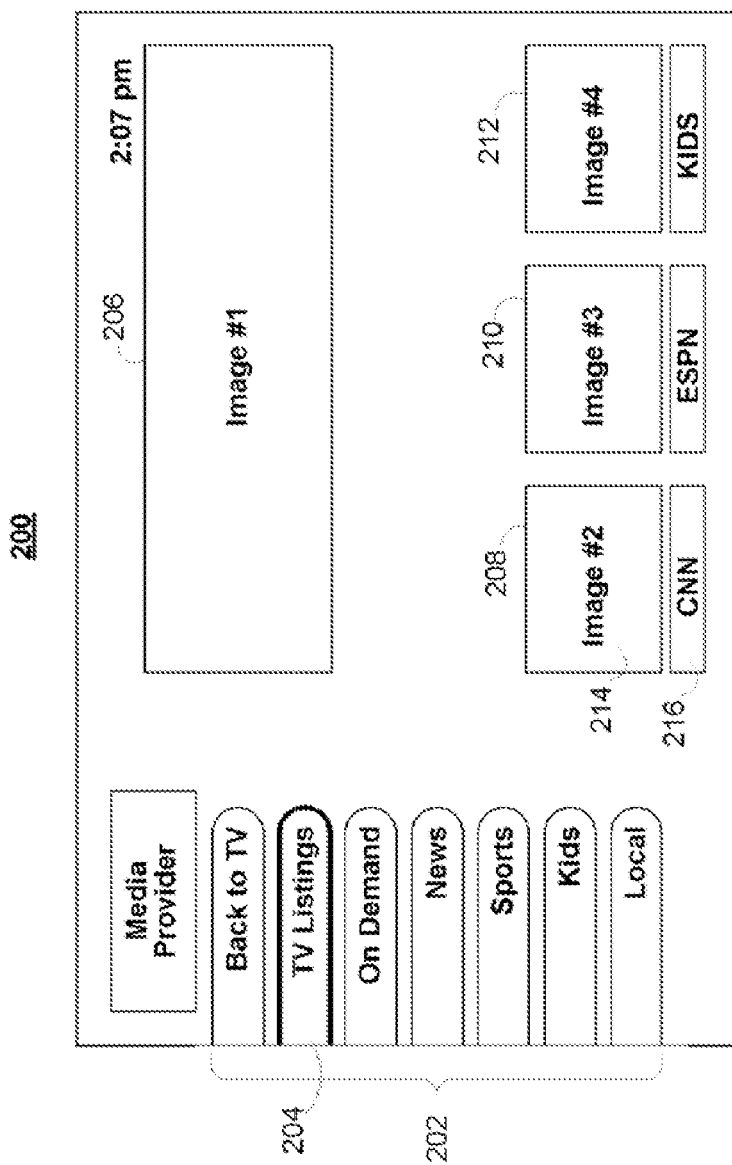

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
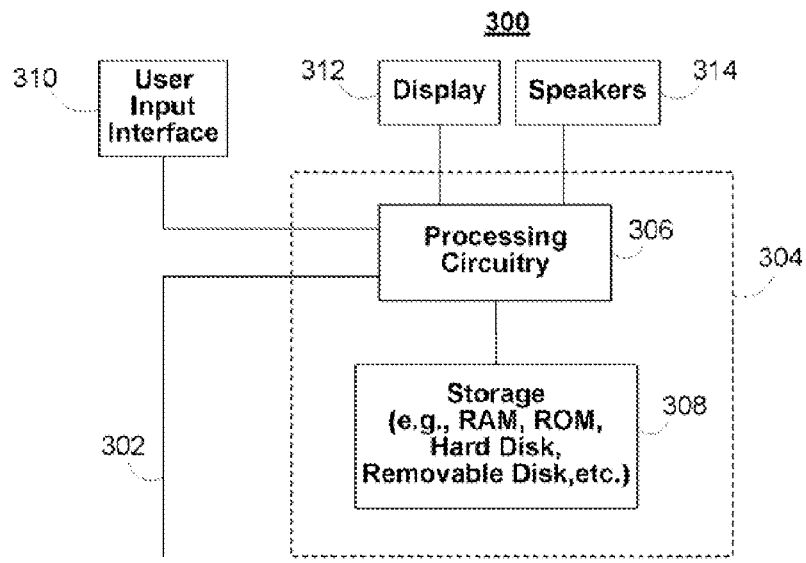
FIG. 3 shows an illustrative user equipment device in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
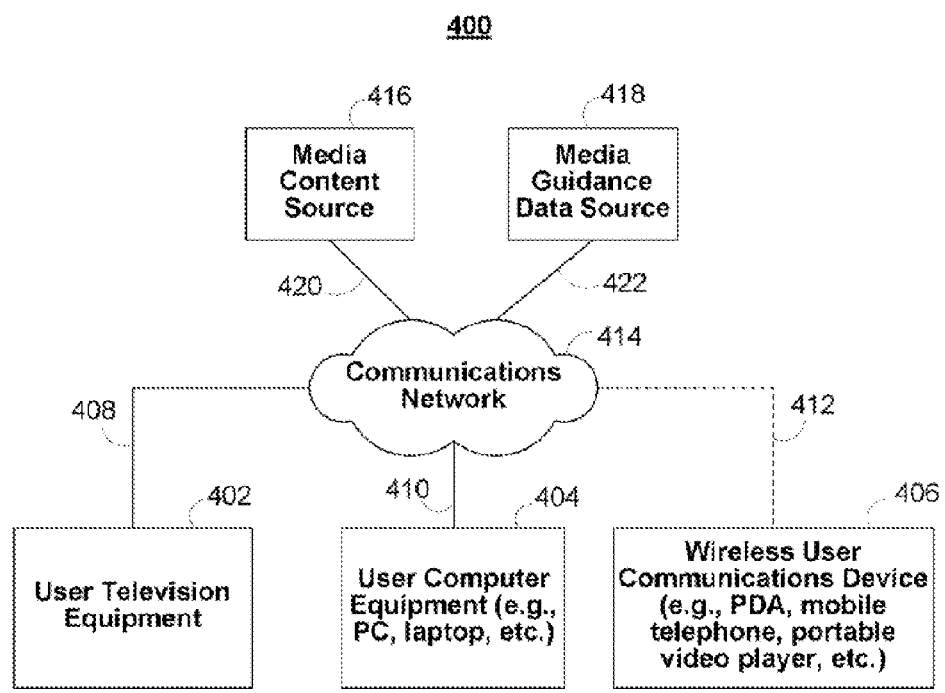
FIG. 4 is a diagram of an illustrative cross-platform interactive media system in accordance with some embodiments of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be received and transmitted by media guidance data source 418 as metadata. Metadata is data on content or on other types of data. Metadata may include information on files, such as metadata for a specific file accessible via on-demand, information on content, such as program guide listings and other media guidance data, or even information on metadata, such as metadata describing how program guide listings are to be displayed. Metadata may serve to inform the user about content, may instruct the user equipment device how to display or process content or other metadata, and may even be used to monitor data transmitted and received, such as metadata on the size of transferred files or the rate of the transfer.

Metadata may have a metadata format associated with it. Formats dictate how metadata is to be interpreted by a processor. The metadata format may specify fields within the metadata, and how a processor is to interpret the information found within these fields. For example, a metadata format may dictate that metadata used to generate the program guide listing of a program contains a field for the title of the program and another field for a summary of the program. In other examples, broadcast content metadata may include a field for the content's timeslot, on-demand content metadata may include a field for conveying a time frame the content will be available for, and Internet content metadata may contain a link to a website the content is to be retrieved from.

The metadata format may be a standardized format that specifies definitions for information found in each field. For example, the metadata format may specify that information found within a particular field of the metadata is the full title of the content. Processes that utilize the metadata may also require the metadata to be in a particular format. Similarly to the metadata format above, these process specific formats may set requirements on what information should be located in individual fields and how this information is to be formatted. Metadata may need to comply with a process specific format for the process to execute correctly.

Providers of metadata may also format metadata for a specific purpose. For example, if metadata is used to generate a program guide listing for display, the information inserted into individual fields of the metadata may be influenced by the future appearance of the program guide listing when displayed. In one example, an editor at the metadata provider may specify that a field of the metadata for the title of a program should be populated with a shortened version of the program title. A processor at the metadata provider may also generate the shortened version of the program title and insert it into the metadata automatically. Receiving metadata that contains a shortened title may result in the program title being displayed nicely within the program guide listings by avoiding the program title being cut short or appearing crammed. However, inserting a shortened program title into the metadata may be contrary to the metadata format. The shortened program title may also comply with the metadata format, but still fail to comply with a process specific format, and interfere with a process that retrieves information from the metadata and that requires a full program title. If the metadata does not meet the requirements set forth by the metadata format, a process specific format, or both, the metadata may be considered improperly formatted.

Metadata may be provided to the user equipment devices using any suitable approach. In some embodiments, the guidance application may be a stand-alone interactive television program guide that receives metadata via a data feed (e.g., a continuous feed or trickle feed).

Metadata and other guidance data may be provided to the user equipment on a television channel sideband, using an in-band digital signal, using an out-of-band digital signal, or by any other suitable data transmission technique. Metadata and other media guidance data may be provided to user equipment on multiple analog or digital television channels.

In some embodiments, metadata from media guidance data source 418 may be provided to users' equipment using a client-server approach. For example, a user equipment device may pull metadata from a server, or a server may push media guidance data to a user equipment device. In some embodiments, a guidance application client residing on the user's equipment may initiate sessions with source 418 to obtain metadata when needed, e.g., when metadata is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or metadata delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide the metadata described above. In addition to content and/or metadata, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
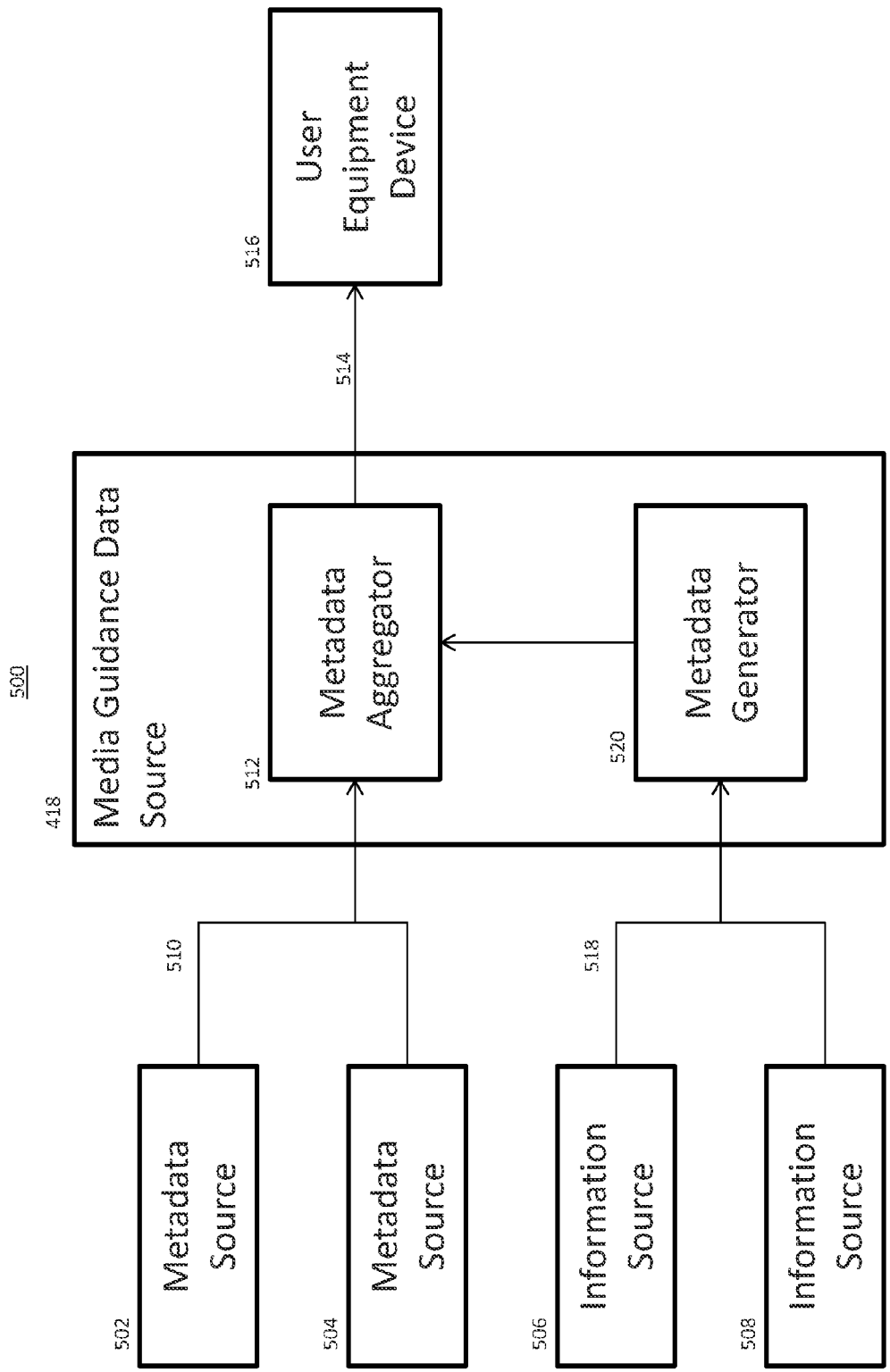
FIG. 5 is a diagram of an illustrative flow of the metadata associated from metadata and information sources, through a media guidance data source, to the user equipment device, in accordance with some embodiments of the invention.

FIG. 5 is a functional diagram of media guidance data source 418 and its interactions with other devices. In particular, media guidance data source 418 may be equipped with metadata aggregator 512, which receives metadata from metadata sources 502 and 504 over connection 510 and transmits metadata to user equipment device 516 over connection 514. User equipment device 516 may be an embodiment of user equipment device 300. The media guidance data source may also generate metadata itself via metadata generator 520, which receives information from information sources 506 and 508 via connection 518 and sends newly generated metadata to metadata aggregator 512.

Due to the broad nature of metadata, metadata aggregator 512 may collect metadata from a number of sources before packing it and sending it to user equipment device. This process may alternatively, or in combination, be also performed at user equipment device 516, with user equipment device 516 generating or aggregating further metadata.

Metadata may be received by metadata aggregator 512 from a single source of metadata, such as metadata source 502. In this scenario, metadata source may be a central provider of metadata or a separate commercial entity that specializes in generating metadata. For example, in a broadcast system, a central processing facility may collect information on programs to be broadcast on all channels, use this information to generate metadata containing the program guide listings for each channel, and forward this metadata to regional headends. These regional headends may edit the metadata to personalize, or otherwise modify, it for groups of user equipment devices or individual user equipment devices, before forwarding the metadata to user equipment device 516.

Metadata aggregator 512 may also receive metadata from multiple sources, such as metadata source 502 and metadata source 504. Individual content providers may, for example, generate and/or transmit metadata associated with their content. As another example, media guidance data source 418 may be part of an online portal that retrieves videos from a number of websites that provide content, and gives the user the ability to access these videos through a single portal website. Each of the content providers in this example may generate metadata for its own videos and forward it to media guidance data source 418 for inclusion in the portal website. Metadata may also be received from multiple providers of metadata that are un-related to the content provider.

Media guidance source 418 may also generate further metadata through metadata generator 520. Metadata generator 520 may generate metadata that is independent of any individual media content. Such metadata may, for example, instruct user equipment device 516 how to display the media guidance application. Information used to generate metadata may also be received via user input. For example, in the context of a content submission website, while uploading content users may also input a description or other information regarding the content. In this example, metadata generator 520 may generate metadata associated with the user submitted content based on this user input. Metadata generator 520 may also collect information regarding content or other data from one or more information sources, such as information source 506 and/or information source 508, and then generate further metadata based on this information.

Information source 506 may be the content provider, which, unlike metadata source 502, does not actually generate metadata. For example, media guidance data source 418 may have access to a database on content provided by the content provider, but this database may not contain metadata. Such a database may only contain information on available programming without this information being formatted as metadata usable by metadata aggregator 512. In this scenario, metadata generator 520 may collect this information and utilize it to generate metadata that is then made available to metadata aggregator 512. In another example, information source 506 may be a website of a content provider that includes information regarding available or soon to be available content. Metadata generator 520 may download such a website and use this information to generate further metadata. Information source 506 may also be a third party source of information. For example, metadata generator 520 may use information received from websites such as online encyclopedias, online movie databases, or a website dedicated to a specific movie to generate new metadata with information regarding content.

Metadata received from metadata source 506, metadata source 504 and metadata generator 520 is then collected by metadata aggregator 512. Metadata aggregator may select which metadata is sent to user equipment device 516, may organize metadata to ensure that it is properly associated with content and utilized by the media guidance application, and may generate requests to any of metadata source 502, metadata source 504 or metadata generator 512 if further metadata is necessary or desired. Once metadata has been assembled, it may be sent to user equipment device 516 for consumption.

Metadata may come in a variety of metadata formats. FIG. 6 illustrates metadata file 600 containing metadata 690 and metadata 692 within data structure 688, all of which relate to content 686. Metadata 690, metadata 692, and data structure 688 may each have a header, such as headers 694, 696 and 698 respectively. Information found within metadata file 600 may be labeled via tags 602, 604, 620, 622, 668 and 669 and contained in fields 606-618, 624-666 and 670-686. Metadata file may also contain the content it relates to, or a link thereto, such as content 686.

Metadata file 600 may relate to a single piece of content. It may include all metadata associated with the content grouped together, or only a subset thereof. Metadata file 600 may also have metadata related to multiple contents. All metadata and/or other content found in metadata file 600 may be stored within a data structure, in this case data structure 688. Metadata may be hierarchically organized, and a data structure may itself be formatted as metadata. In metadata file 600, for example, data structure 688 is in a metadata format and contains metadata 690, metadata 692, and content 686.

Information to be conveyed by metadata may be stored in fields, with the metadata format specifying how individual fields are designated and defining what information is to be stored in each field. Some metadata formats, such as the format of metadata file 600, may designate fields via tags. These tags may be textual descriptions of the information they are to contain or may be a string or other value associated with a particular field. In the case of metadata file 600, tag 602 indicates the beginning of a new data structure. In this case the information between <Data structure> and </Data structure> is data structure 688. Similarly, tags 620 and 668 define the start of metadata 690 and metadata 692 respectively. Here, the information between <Metadata> and </Metadata> is one of metadata 690 and 692. In the same manner, tags 604, 622 and 669 each define the start of headers 694, 696 and 698 respectively.

Individual fields may be also designated by their position. For example, a metadata format may dictate a designation of a new field, with the order of the fields dictating what information is to be stored in each field. Alternatively, or in combination, each field may have a particular size associated with it, in which case the position of data within the metadata file may dictate what field the data belongs to.

Regardless of how individual fields are designated, the metadata format may specify what information is to be placed in each field. For example, the format of metadata file 600 may specify that field 634 contains the title of the content that will be displayed within a program guide listing, whereas field 636 contains a standardized title for the content that will be used to index the content or to search for further information on the content. The standardized title may be the full title of the content, the official title of the content or the title as found within a movie database. There may also be length restrictions on the information that can be found within each field. For example, field 634 may be restricted to a specific number of characters, while field 636 lacks such a restriction.

As previously mentioned, a process utilizing metadata may also have a process specific format that metadata may need to conform to in order for the process to execute correctly. The process specific format may be complimentary, or even identical, to the metadata format, and may be more or less restrictive than the metadata format. For example, the metadata format may define a field as the title field and specify that it contains a title for the content. A process utilizing the metadata may further require that the title found in the title field must be the title of the content as listed on the website of the content provider.

Information regarding data structure 688, metadata 690 or metadata 692 may be conveyed via header 694, header 696 and header 698, respectively. These headers may describe the metadata itself instead of containing further information regarding the content. Header 694 of data structure 688 may contain a provider name in field 606, a data structure name in field 608, a data structure description in field 612, a content ID in field 614, a data structure type in field 616, and a data structure format in field 618.

The name of the provider may specify who generated the content file, the data structure/metadata or information found within the data structure/metadata. The provider name may be used to monitor and provide information regarding the metadata or content provider, and can even be displayed on the user equipment device in case the user wishes to obtain more information from the same source. The provider name may also be utilized to identify which information source a process should communicate with in order to obtain further information regarding the content. Similarly, the data structure name and the data structure description may be used internal to the system without ever being displayed to the user, or may be displayed as part of program guide listings or other informational displays. If the content is not found within metadata file 600, or if metadata for content is spread across multiple metadata files, content ID may be used to match data structures and metadata to content. For example, when information regarding a specific piece of content is to be displayed, a processor may identify a content ID and search a database of metadata for this content ID. Alternatively, the processor may search for any other field, such as for a data structure name.

The data structure type may specify what sort of information is found within data structure 688, and inform the processor how to utilize this information. For example, data structure type may specify that the data structure contains information regarding a piece of content found on-demand, and that the processor should thus retrieve this data structure and utilize the metadata to generate an informational screen for the content after the user has selected the content from within an on-demand menu. Since the data structure type thus conveys information regarding what processes may utilize the metadata, the data structure type may also be used to identify process specific formats that are not inherent in the metadata format. Finally, the data structure format may specify a metadata format for the data structure, thereby providing instructions to the processor on how to read data structure 688. A data structure or metadata format may specify how the data structure or metadata is to be read and interpreted by a processor, whereas the type of a data structure or metadata may specify how the data structure or metadata is to be utilized and in what context.

Header 694 may also be for the content itself. In that case, instead of, or in combination with, containing data structure name and data structure type, it may contain content name and content type.

Each of metadata 690 and metadata 692 may have their own headers. These headers may contain a metadata name in field 624 or field 670, a metadata description in field 636 or field 671, a content ID in field 628 or field 672, a metadata type in field 630 or field 674, and a metadata format in field 632 or field 676.

As is the case with data structure 688, a single data structure may contain multiple pieces of metadata that may in turn be of different types and serve different purposes. As indicated by fields 624 and 626, metadata 690 may be used to generate a program guide listing for content 686, whereas fields 670 and 671 indicate that metadata 692 relates to the actual file and how a processor is to present content 686. Metadata type may indicate what sort of information is found in each metadata. Thus, field 630 indicates that metadata 690 contains content information and field 674 indicates that metadata 698 contains file information. Thus, as previously mentioned, the format of metadata may specify how to read and interpret the metadata, and the type may specify how to utilize the metadata and its context.

Each data structure or piece of metadata found in metadata file 600 may have the same or a different data structure/metadata format. Also, each data structure and piece of metadata may relate to the same or to different content. Fields 614, 628 and 672 may be used to associate metadata or data structures found in one or more metadata files with specific content.

Metadata 690 may have a number of fields that contain information regarding content 686. Such information may include a brief title in field 634, a standardized title in field 636, an ISAN number in field 638, an episode name in field 640, an episode number in field 641, a content summary in field 644, a content rating in field 646, actor names in fields 648 and 650, a content category in field 652, a content genre in field 654, a content type in field 656, content locations in fields 658, 660, and 662, a billing ID in field 664, and a content availability in field 666.

As previously mentioned, the format of the metadata may specify what information is to be found in each field, as well as the format of the information itself. For example, content ratings may be chosen from a limited set, thereby allowing the processor to use simple Booleans to distinguish between the different ratings. Similarly, the metadata format may require that the standardized title found in field 636 is the full title of the content, the official title of the content, or the title of the content as listed in a database. Alternatively, the metadata format may be vague on what information is found within field 636, simply stating that it's a content title. The metadata format may also specify that the content summary may contain any appropriate text, and that this information is not used for processing by the media guidance application, but instead simply displayed within a program guide listings. The metadata format may also specify lengths for individual field. For example, field 634 may be limited to a certain number of characters to ensure that any information found within is properly displayed at the user equipment device. The metadata format may also specify how data found within fields 658, 660, 662 and 666 is to be formatted. For example, in the case of field 666, the metadata format may specify that dates are to be formatted as yyyy-mm-dd, and that the first date is to be the starting date of when the content will be available, while the second date is the end date. Each of these exemplary requirements set forth by the metadata format may also be a requirement of a process specific format.

Metadata 692 may contain information on the file of content 686, and how this content is to be processed and presented on the user equipment device. Metadata 692 may contain an encryption value in field 678, an audio type in field 680, a screen format in field 682, and a file size in field 684.

The encryption value in field 678 may be required to allow the processor to decrypt a received file. In this case, field 678 may contain information on the type of encryption present, or a seed value to be used for the decryption. The audio type and screen format may provide directions on how content 686 is to be displayed. The file size may be used by the system to monitor the total amount of data that is transferred between the user equipment device and a remote server.

Metadata file 600 may also contain, embedded within it, a file of the content itself, such as content 686. In this scenario, metadata file 600 may act as a wrapper file for content 686. Metadata file 600 may instead, or in combination, also contain a link to a separate content file. The actual content may also be received completely independently, and the processor may match content and metadata using a content ID, such as the content IDs found in fields 614, 628 and 672.

While the metadata format specifies fields and field content, sometimes received metadata may not comply with this format. Improperly formatted metadata may be received for a number of reasons. One potential source of improper formatting is selections made by the content provider. A metadata source may populate fields to achieve goals besides complying with the metadata format. For example, when metadata is used to generate program listings, providers of metadata may purposely insert a shortened title into a title field to ensure the title fits properly into the program listing for the content, even though the metadata format specifies that this field is to contain the full title.

Furthermore, metadata may comply with the metadata format, but still fail to comply with a process specific format, and thus be improperly formatted for the purpose of a particular feature. In the above example, the metadata format may not actually specify what exact version of the title is to be inserted into the title field, in which case the shortened version of the title would also comply with the metadata format. However, another process may utilize the title in this field to search for further information regarding the content, and may require the full title in order to perform a proper search. In this case, although the title field is properly formatted from the perspective of the metadata format, it may still be improperly formatted from the perspective of the process specific format of the search feature. As another example, the metadata format may not specify the format of times stored within fields 658-662. A provider of metadata may format this information as "XX min and YY sec" so that it is nicely displayed within an informational screen, but a feature that allows the user to skip forward in the content may require these fields to appear as "XX:YY". As with the title field example, here also the received field is properly formatted according to the metadata format, but fails to meet requirements set forth by the process specific format of the skip feature.

Metadata may also be improperly formatted due to errors in metadata generation. Metadata received from one source may, for example, have the same shortened title in both field 624 for the brief title and field 626 for the standardized title. Different sources may in fact use an altogether different metadata format for their metadata from the format specified in fields 618, 632 and 676. Information that is parsed to populate metadata file 600 may itself not be in an expected format, thereby resulting in improperly formatted metadata being automatically generated based on this information. For example, the database of a provider of on-demand content may generally store the start and end date of the availability of content in the yyyy-mm-dd format, but a single entry may have accidently been inputted in the mm-dd-yy format. Thus, although the metadata generation process may be correct for most content, it may still result in an improperly formatted field 666. Another potential source of improperly formatted metadata may be that some fields are simply missing. For example, a source of metadata may not populate field 640 with an episode name. Alternatively, or in combination, information may be placed in the wrong field. For example, the episode name of field 640 may instead have been included in the standardize title of field 636, thereby resulting in both fields being improperly formatted.

Figure 7:
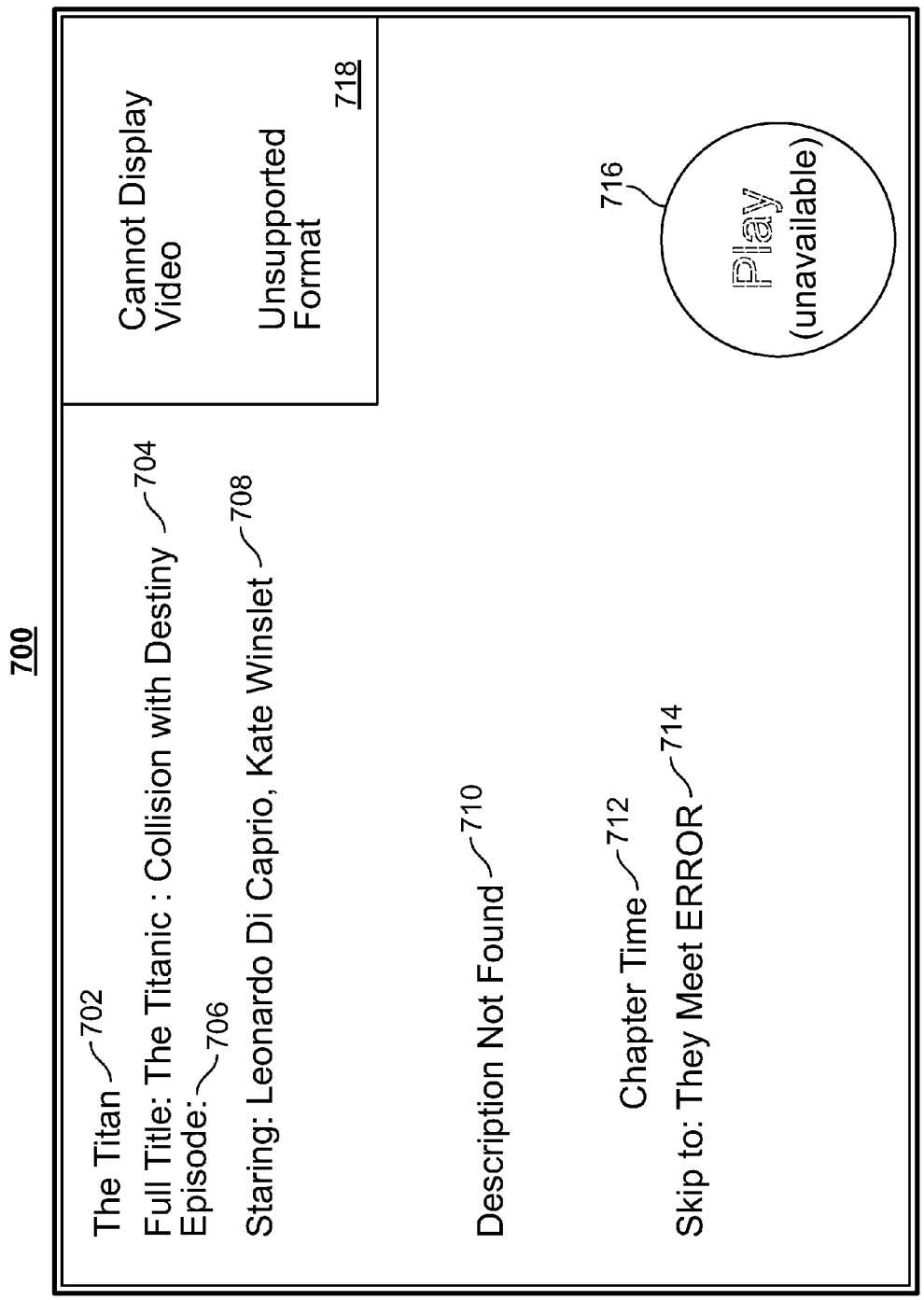
FIG. 7 shows an illustrative display screen, which may result from improperly formatted metadata, in accordance with some embodiments of the invention.

Regardless of reason, improperly formatted metadata may result in a number of possible degradations in a user's viewing experience. One such potential result is program guide listing 700 in FIG. 7. This listing includes title 702, full title 704, episode name 706, list of actors 708, full description 710, chapter list 712 with entry 714, play option 716 and preview window 718. The results of receiving improperly formatted metadata may range from an improperly formatted display, to missing features and information, and finally to the content becoming altogether inaccessible.

For example, a metadata source may fail to include a separate field for each actor present in a movie, and instead combine fields 648 and 650 into a single field. However, the metadata format may specify that each of these fields contains a single individual actor. In that case, list of actors 708 may read "Leonardo DiCaprio, Kate Winslet" instead of "Leonardo DiCaprio and Kate Winslet".

The received metadata may fail to conform to size requirements of individual fields. For example, a process specific format may specify that field 634 containing the brief title should be limited to 9 characters, since that is the number of characters that will be displayed in a program guide listings. In that case, the content title displayed in listing 700 may read "The Titan" if the metadata contains "The Titanic", while a properly formatted and more informative brief title would have been "Titanic". Another example of improperly formatted metadata that may result in a confusing program guide listing is if the received metadata contains information placed into the wrong field. As previously mentioned, a source of metadata may include the title of an episode in standardized title field 636, and leave episode name field 640 empty. In that case, full title 704 may contain incorrect information that may prevent the media guidance application from locating the metadata or content associated with it, or prevent the media guidance application from including program guide listing 700 in correct locations within its menus, while episode title 706 remains empty.

Improperly formatted metadata may also result in missing information. For example, full description 710 may be received by the system as a separate metadata file, but if content ID is not properly populated the system may be unable to match the full description metadata with the correct content, thus resulting in a program listing that is missing this information. This may be due to content ID field 614 containing incorrect information, or due to it being labeled with a wrong tag. As another example, full description 710 may be based on supplemental information retrieved according to the title extracted from the title field of the metadata. As previously mentioned, the metadata format may not specify exactly what version of the title should be found within the title field, and a shortened title inserted by the metadata provider would thus comply with the metadata format. In fact, the metadata format may even require a shortened title to be inserted. However, the process for retrieving the supplemental information may require the full title of the content in order to retrieve this supplemental information. The shortened title would thus comply with the metadata format, but fail to comply with the process specific format of the supplemental information retrieval process, and, therefore, still be improperly formatted for the purpose of the supplemental information retrieval process.

Improperly formatted metadata may also result in entire features becoming unavailable for the user to select. Chapter list 712 normally allows the user to select a chapter, in which case the media guidance application would begin playing the content from the time specified in fields 658-662. However, if these fields contain a time that is improperly formatted, whether in view of the metadata format or in view of the process specific format of the skip feature, the media guidance application may be unable to identify the time stamp of chapter 714 and thus unable to skip to this time in the content. Similarly, if availability field 666 is missing or improperly formatted, the media guidance application may believe that the content is not available for viewing at this time, and remove play option 716.

Finally, improperly formatted metadata may result in the system being unable to display the content altogether. For example, preview window 718 would normally play the beginning of the content, but if field 680 does not specify an appropriate screen format, the system may not recognize the screen format and thus believe that it is unable to display the content. Thus, even if play option 716 were available, the system would still fail to present the content to the user.

While program guide listing 700 contains a number of exemplary results of receiving improperly formatted metadata, any field or tag described above, and any other potential component of metadata, may fail to comply with the metadata format or a format required by a process, and degrade a user's overall experience and interaction with the media guidance application.

Figure 8:
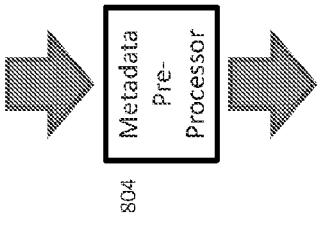
FIG. 8 is a diagram of an illustrative functionality of a metadata pre-processor in accordance with some embodiments of the invention.

To correct improperly formatted metadata, media guidance data source 418, user equipment device 516, or any other device in the system may include metadata pre-processor 804 of FIG. 8. Metadata pre-processor 804 may receive improperly formatted metadata 802 as input, and modify it to generate properly formatted metadata 806. Metadata pre-processor 804, and all other metadata pre-processors discussed in this application, may be implemented using processor circuitry 306. In this example, metadata pre-processor 804 may pre-process improperly formatted fields 808-826 to conform to a format, regardless whether this is a metadata format or a process specific format, which results in fields 828-846.

Metadata pre-processor 804 may modify any component of metadata 802 to conform it to a format. For example, metadata pre-processor 804 may edit the tag associated with field 808 to correct it from <Content_Number> to the <Content_ID> tag found in field 828, as required by the metadata format. Having this tag improperly formatted may have prevented the processor from matching this metadata to specific content, resulting in information stored in metadata 802 not being displayed along with other information in program guide listing 700. By modifying field 808, the media guidance application may be able to provide full description 710 that was previously missing from program guide listing 700.

Metadata pre-processor 804 may also modify the content of a particular field. For example, field 810 may contain more character than allowed by a process specific format associated with displaying program guide listings, which resulted in title 702 being cut short in program guide listing 700. Metadata pre-process 804 may determine that field 810 is too long, and use a lookup table to modify it into field 830, thereby resulting in a more logical and informative shortened title being displayed.

Metadata pre-processor 804 may also correct for information placed in the wrong field. For example, in metadata 802, standardized title field 812 contains both the title of a fictional series as well as the name of a specific episode, while episode name field 814 has been left empty. Metadata pre-processor 804 may parse received metadata and determine that the standardized title also contains the name of an episode. In that case, metadata pre-processor 804 may remove the episode title from title field 832, and place the name of the episode in field 834.

Metadata pre-processor 804 may also add new fields to metadata 802. In this example, field 818 contains the names of both lead actors, although the metadata format specifies that each actor field should contain only the name of a single actor. Here, metadata pre-processor 804 may utilize information already found within metadata 804 to generate field 839, containing the name of an actor originally included in field 818, and remove the same name from field 838. Metadata pre-processor may also generate new fields based on information not originally found in received metadata 802.

Metadata pre-processor 804 may also alter the formatting of the information within fields 820, 824 and 826 to comply with a format. A process may require these fields to be in a particular format, in which case metadata pre-processor 804 may determine that fields 820 and 822 are not properly formatted and modify them to generate properly formatted fields 840 and 842. Similarly, the metadata format or another process may require individual fields to be in specific units. For example, the metadata format or a process specific format may require that field 826 be in bytes, whereas metadata 802 currently has field 826 in gigabytes. This error in formatting may not have impacted the display of program guide listing 700, since this information is only used internally by the system to monitor data transfers, but it would result in incorrect monitoring. Metadata pre-processor may determine that the file size is inappropriately small, does not match up with an expected value, or does not reflect a file size measured by another component of the system, and edit the improperly formatted file size to generate properly formatted field 846.

Metadata pre-processor 804 may also ensure that field values are taken from an appropriate set. For example, a process may require that field 824 include one of a limited number of texts that the processor recognizes as screen formats. If field 824 does not comply with this process specific format requirement, the system may be unable to display the content, believing that it has received content in an unsupported format. Metadata pre-processor 804 may correct for this by ensuring that the content of field 824 is taken from an appropriate set, and in the process generate field 844.

As previously mentioned, the metadata pre-processor may take as input any metadata, check whether any components do not comply with a metadata format or a process specific format, and modify the received metadata to comply with the metadata format or process specific format. These steps may be referred to as pre-processing the metadata.

A metadata pre-processor may be found in a number of locations, both physically and functionally, within the system. In system 900 of FIG. 9A, metadata aggregator 904 of media guidance data source 912 receives metadata from metadata source 902 and forwards it to user equipment device 914. In user equipment device 914, the metadata is stored in metadata database 906. When processor 910 is about to utilize the metadata, the metadata is first passed through metadata pre-processor 908 for pre-processing and to be modified if necessary.

In this setup, only metadata that is to be utilized by processor 910 is modified by metadata pre-processor 908. This results in metadata pre-processor 908 processing only metadata that will actually be utilized and not unnecessarily modifying metadata that is never utilized. As metadata is modified by metadata pre-processor 908, the modified version may be saved in metadata database 906 so that the same modification need not be performed the next time processor 910 attempts to access the same metadata or utilize metadata for the same purpose.

In system 950 of FIG. 9B, metadata aggregator 954 of media guidance data source 962 receives metadata from metadata source 952 and forwards it to user equipment device 964. In user equipment device 964, the metadata is passed through metadata pre-processor upon receipt, and properly formatted metadata is stored in metadata database 956. When processor 960 is about to utilize metadata, it may access metadata database 956 directly.

In this setup, metadata is pre-processed before being stored in metadata database 956, thereby ensuring that metadata found in metadata database 956 is properly formatted and that it can be utilized by processor 960 without a delay due to pre-processing. Every piece of metadata may be passed through metadata pre-processor 958 immediately upon receipt, or the metadata may first be stored in metadata database 956 or another database within the user equipment device, before being loaded by metadata pre-processor 958 for modification. This allows metadata pre-processor 958 to operate on metadata stored in metadata database 956 when metadata does not urgently need to be pre-processed or when computational resources are readily available. Metadata that has or has not been passed through metadata pre-processor 958 may be labeled with a flag to inform the system that this metadata already has been pre-processed or still needs to be pre-processed before being utilized by processor 960.

This could result in a hybrid between system 900 and system 950, with some metadata being processed immediately upon receipt by the user equipment device, while others are processed when the processor requests it. For metadata pre-processed upon receipt, pre-processor 958 may use priorities set by the system or based off of previous user actions to determine which metadata to pre-process immediately, and which to store in another database for pre-processing when processor 960 requests it. The same or similar priorities may be used to determine what metadata to process when the pre-processor is otherwise idle.

In system 1000 of FIG. 10A, media guidance data source 1012 receives metadata from metadata source 1002, and pre-processes the received metadata with metadata pre-processor 1008 before sending it to metadata aggregator 1004. Metadata aggregator 1004 collects metadata and forwards it to user equipment device 1014. In user equipment device 1014, properly formatted metadata is stored in metadata database 1006. When processor 1010 is about to utilize metadata, it may access metadata database 1006 directly.

In this setup, metadata is passed through the metadata pre-processor immediately upon receipt from metadata source 1002. This results in the rest of the system only dealing with properly formatted metadata which may avoid some issues caused by improper formatting. It also ensures that metadata is uniformly formatted, since individual user equipment devices do not modify their own metadata.

In system 1050 of FIG. 10B, metadata aggregator 1054 of media guidance data source 1062 receives metadata from metadata source 1052. From there, metadata is passed through metadata pre-processor 1058 before being sent to user equipment device 1064. In user equipment device 1064, properly formatted metadata is stored in metadata database 1056. When processor 1060 is about to utilize metadata, it may access metadata database 1056 directly.

In this setup, metadata is passed through metadata pre-processor 1058 after it has been assembled by metadata aggregator 1054. This results in metadata that will not be sent to user equipment devices not being pre-processed. Metadata pre-processor 1058 may pre-process all metadata that is to be sent to any user equipment devices, or only metadata as it is assembled to be sent to an individual user equipment device. Also, as with system 1000, this setup ensures that metadata is uniformly properly formatted, since individual user equipment devices do not modify their own metadata.

Systems 900, 950, 1000, and 1050 may also be combined in any manner. Multiple metadata pre-processors may exist, or a single metadata pre-processor may receive metadata for pre-processor from multiple functional locations within the system. For example, the same metadata pre-processor may pre-process metadata immediately upon receipt from a metadata provider and after the metadata aggregator. Furthermore, not all steps involved in pre-processing metadata need to occur at the same physical location or be performed by the same component. For example, user equipment device 1064 may determine that received metadata is improperly formatted, and send the received metadata or a pointer thereto to media guidance data source 1062, in which case a metadata pre-processor found at media guidance data 1062 may modify the improperly formatted metadata and reply with a properly formatted version of the metadata.

Figure 11:
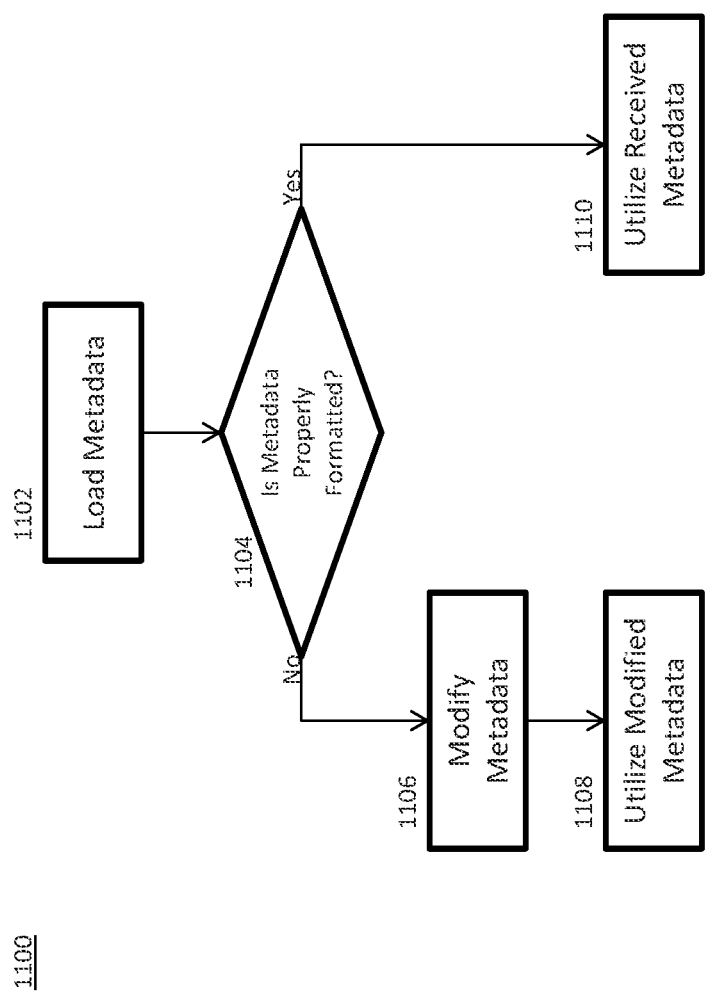
FIG. 11 is an illustrative flow chart of a process for receiving, modifying and utilizing metadata in accordance with some embodiments of the invention.

FIG. 11 shows a flow chart of process 1100 for pre-processing metadata by metadata pre-processor 804. Process 1100 may start due to another component of the system requesting metadata pre-processor 804 to pre-process metadata without providing any particular metadata, or to pre-process a specific piece of metadata. Process 1100 may also be triggered by metadata pre-processor 804 receiving new metadata. Metadata pre-processor 804 may even begin pre-processing previously stored metadata based on a lack of activity in the system, and utilize this lull to correct improperly formatted metadata without impacting the performance of other components in the system.

Process 1100 may also be triggered by a second process running on the same or another component of the system. The second process may utilize metadata to provide a feature. The second process may be triggered by a user selecting the feature or by the system requiring information provided by the second process. The second process may in turn trigger process 1100 to ensure that metadata used by the second process is properly formatted. The second process may provide metadata pre-processor 804 with the metadata to be pre-process. The second process may also provide metadata pre-processor 804 with the process specific format the metadata has to comply with. Metadata pre-processor 804 may also identify the metadata and/or the process specific format. This identification may be based on the identity of the second process.

At step 1102 metadata pre-processor 804 loads the metadata. Depending on the physical and functional location of metadata pre-processor within the system, loading may refer to received metadata from a remote server, another component of the same device, or even another process in the same component. Loading may also refer to retrieving metadata from a local or remote database. Metadata pre-processor 804 may receive the metadata to be pre-processed itself or a link thereto. Metadata pre-processor may even determine itself what metadata to pre-process based on what metadata was last pre-processed or according to other priorities, such as which metadata the processor is most likely to require in the near future.

At step 1104 metadata pre-processor 804 may determine whether the loaded metadata is properly formatted via one of the approaches discussed in greater detail below.

If metadata pre-processor 804 determines at step 1104 that the loaded metadata is properly formatted, it may utilize it as is. If, however, metadata pre-processor determines at step 1104 that the metadata is not properly formatted, metadata pre-processor may modify the loaded metadata at step 1106. Here, modifying may refer to creating a new copy of the loaded metadata or replacing fields/tags of already existing metadata. Approaches for modifying the loaded metadata are also discussed in greater detail below. At step 1108 metadata pre-processor may then utilize the modified metadata.

Depending on the context of process 1100 and where metadata pre-processor 804 is implemented, utilizing metadata may refer to a number of activities. In one scenario this may involve storing the modified metadata to a database. If the metadata was properly formatted, the originally loaded metadata may be left as is, may be stored in a second database, or a new copy thereof may be stored in the second database. Utilizing metadata may also involve passing metadata to another process, transmitting metadata to another component within the system or transmitting metadata to another device altogether. There, the metadata may be stored in another database, may be used to manipulate other data structures, may be used to retrieve further information, may be used as instructions for running a process, or may be used to generate a display. For example, where metadata contains a program guide listing, the properly formatted metadata may be displayed within a program guide. Metadata may also be used directly by metadata pre-processor 804 to pre-process other metadata.

Furthermore, metadata pre-processor 804 need not pre-process the entire metadata. For example, if process 1100 is trigged by a second process that only utilizes a subset of fields found within the metadata, metadata pre-processor may determine whether just the fields within this subset are properly formatted and modify them if they are not. In another example, if the second process only utilizes the content title, metadata pre-processor may determine whether just the content title is properly formatted, modify the content title if necessary, and provide just the properly formatted content title to the second process.

In one exemplary implementation of process 1100, process 1100 may be triggered by a second process that implements a search feature. When a user wishes to receive further information related to a particular program, the user may select the search feature found within the program's program guide listing. The search features then searches for and provides this information by retrieving the metadata that was used to display the program guide listing, extracting the title of the program from the metadata, and performing the search based on the title. However, a metadata provider may have inserted a shortened title into the metadata instead of the full title in order to ensure that the title is nicely displayed within the program guide listing. If the search feature were to perform the search using the shortened title, it may fail to identify information related to the program, since it would be searching using a non-standard and mangled version of the title. Thus, instead of directly utilizing the metadata and the title found within to perform the search, the search feature may first trigger process 1100 to pre-process the program's metadata using metadata pre-processor 804. Metadata pre-processor 804 may determine that the shortened title found in the metadata does not comply with the process specific format of the search feature that requires the full title of the program. Metadata pre-processor 804 may then identify the full title of the program and provide it to the search feature. The search feature can then use the full title to correctly search for further information related to the program and display it to the user.

Figure 12:
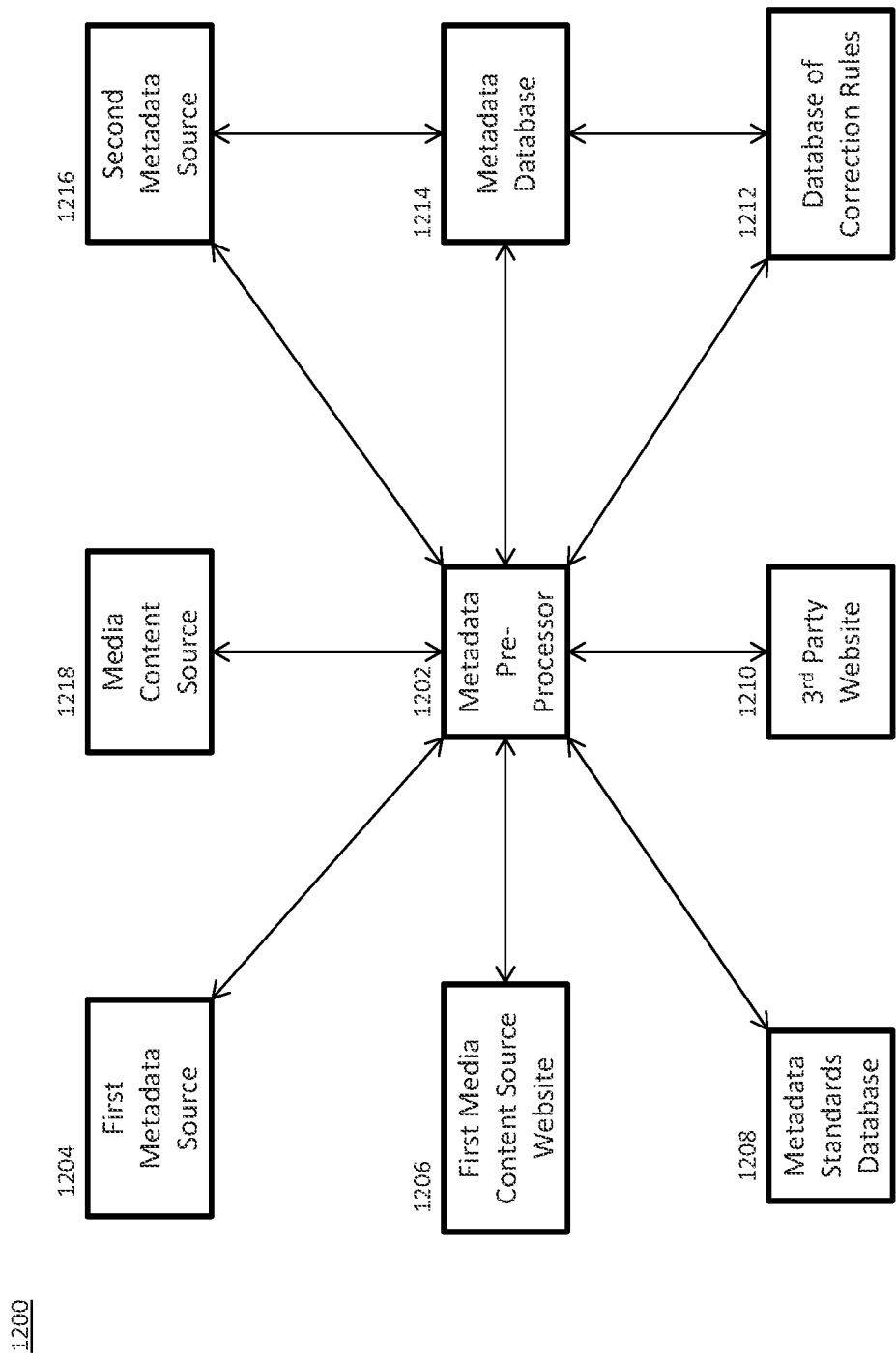
FIG. 12 shows an illustrative environment of a metadata pre-processor with access to a number of sources of information regarding received metadata in accordance with some embodiments of the invention.

A metadata pre-processor may have access to a number of sources of information to determine whether metadata is improperly formatted, and to modify improperly formatted metadata. As shown in FIG. 12, environment 1200 of metadata pre-processor 1202 may include first metadata source 1204, media content source website 1206, metadata standards database 1208, $3^{rd}$ party website 1210, database of correction rules 1212, metadata database 1214, second metadata source 1216 and media content source 1218.

First metadata source 1204 may be the original source of metadata that is being pre-processed by metadata pre-processor 1202. Besides just receiving the original metadata from this source, metadata pre-processor may also communicate with first metadata source 1204 to determine whether received metadata is properly formatted, to modify the received metadata, or to obtain further information regarding the received metadata. Metadata pre-processor 1202 may first attempt to interpret the received metadata according to the metadata format indicated within the metadata or according to the process specific format of the process about to utilize the metadata, and then match this information against further information obtained from first metadata source 1204. For example, metadata pre-processor may read the title field or availability field and then query first metadata source 1204 to determine whether first metadata source 1204 is aware of such content. Alternatively, or in combination, metadata pre-processor 1202 may obtain the same information from first metadata source 1204 in multiple metadata formats, and ensure that the received information is consistent across formats. If there is a mismatch, metadata pre-processor may determine that the received metadata is not properly formatted.

In one situation, metadata pre-processor 1202 may communicate with first metadata source 1204 to request a new version of the received metadata. Such a request may include an indication of formatting errors found in the received metadata. In response, first metadata source 1204 may send a new version of the metadata, potentially one that is properly formatted. In another situation, metadata pre-processor 1202 may request other types of information to allow metadata pre-processor 1202 to modify the received metadata. This information may include information missing from the received metadata, or information that places the received metadata into context and that allows metadata pre-processor 1202 to modify and correct the received metadata using another approach. For example, if the episode name field is missing from received metadata, metadata pre-processor 1202 may communicate with first metadata source 1204 to obtain this information. This information may also allow metadata pre-processor 1202 to identify the content provider, and thereby determine which other source of information to communicate with in order to obtain further information from the content provider. Metadata pre-processor 1202 may send a message to first metadata source 1204 regarding incorrectly formatted metadata even after metadata pre-processor 1202 modified the received metadata to conform to a format.

Such messages may serve to provide feedback to first metadata source 1204, and may be taken into account by first metadata source 1204 when generating or transmitting metadata in the future.

Metadata pre-processor 1202 may also have access to information sources associated with the source of the content that the received metadata is related to. Metadata pre-processor 1202 may use information retrieved from the content provider field of the metadata to determine the source of the content. These sources of information may be used both to determine whether received metadata is properly formatted, and, if not, may be used to modify the received metadata. Such a process may employ techniques similar to those described above in relation to first metadata source 1204. For example, metadata pre-processor 1202 may first extract information from received metadata using the metadata format indicated within the metadata or a process specific format for the process about to utilize the metadata and then match the extracted information against information obtained from media content source 1218. For example, metadata pre-processor 1202 may receive metadata from first metadata source 1204 indicating that a program will be broadcast by a channel at a specific time. Metadata pre-processor may then communicate with media content source 1218 to confirm this information. If the information matches, metadata pre-processor 1202 may determine that the metadata is properly formatted. If the information does not match, metadata pre-processor 1202 may determine that the received metadata was not properly formatted. For example, the format of the broadcast time may have been incorrect, resulting in metadata pre-processor 1218 believing that the content will be broadcast at the wrong time. Information received from media content source 1218 regarding content broadcast at that time would not match information extracted from the metadata, thereby allowing metadata pre-processor 1202 to determine that the received metadata was improperly formatted. Metadata pre-processor 1202 may then use information obtained from media content source 1218 to modify or supplement the improperly formatted received metadata. For example, metadata pre-processor 1202 may obtain information for the closest matching program to the one described by the received metadata, and use information regarding this closest match to supplement or replace information found in the received metadata.

Media content source website 1206 may also be used for a similar purpose and in a similar manner. For example, media content source website 1206 may be the website of a channel that broadcasts the content described by the metadata. Alternatively, or in combination, other sources of information can be used, such as $3^{rd}$ party website 1210. This website may be an online encyclopedia or an Internet database of media information. Metadata pre-processor 1202 may determine which of these sources of information to contact based on information found within the metadata, such as the provider ID extracted from field 610, or based on information received from another information source.

Another potential source of such information may be second metadata source 1216. This may be a second source of metadata for the exact same content, or a source of metadata for related, but different, content. For example, first metadata source 1204 and second metadata source 1216 may be two providers of metadata content. If information received from both and extracted using the respective formats matches, metadata pre-processor 1202 may determine that the metadata received from first metadata source 1204 is properly formatted. Instead of analyzing two instances of metadata for identical content, metadata pre-processor 1202 may also obtain related metadata from first metadata source 1204 and second metadata source 1216, and compare them. This occurs, for example, if metadata is received from two providers of on-demand media, each of which supplies its own metadata. Here, metadata for the same movie that is received from each of the providers may be compared. Since both pieces of metadata relate to the same movie, many fields in the metadata ought to be identical, regardless of provider.

Metadata pre-processor 1202 may also access metadata standards database 1208 for interpreting metadata and extracting information, determining whether received metadata is properly formatted, and modifying the received metadata if it is not. Received metadata may be compared against entries in the metadata standards database to determine what type of metadata it is and whether it matches a metadata format or a process specific format. For example, metadata standards database 1208 may provide examples of metadata of different types and of different metadata formats that can be correlated against received metadata to identify a type and format of the received metadata. Metadata standards database 1208 may also be indexed by the processes utilize the metadata, and allow metadata pre-processor 1202 to quickly retrieve information regarding a process specific format. Metadata standards database 1208 may also contain a computer readable description of metadata types and formats that metadata pre-processor may use to identify the type and format of received metadata. For example, metadata standards database 1208 may specify tags and keywords associated with one or more types or formats for metadata which metadata pre-processor 1202 may search for in the received metadata.

Once a type and/or format for the received metadata has been identified, metadata pre-processor 1202 may use metadata standards database 1208 to determine whether the received metadata is properly formatted. Metadata standards database 1208 may contain all, or a subset thereof, tags or keywords recognized for a particular format or metadata type. Metadata standards database 1208 may also contain a list of tags and fields that the metadata is required to have according to the metadata format or a process specific format. Metadata standards database 1208 may also be used to modify improperly formatted metadata. For example, if a keyword or tag fails to match any keyword or tag found in metadata standards database 1208, metadata pre-processor 1202 may replace the keyword or tag with the closest match found in metadata standards database 1208.

Metadata pre-processor 1202 may also have access to correction rules database 1212 for determining whether received metadata is properly formatted and for modifying the received metadata if it is not. Correction rules database 1212 may contain a set of criteria that must be met for each rule to apply, and a rule associated with each criterion that dictates how the received metadata is to be modified. For example, the criteria may designate specific metadata that is known to contain improper formatting, and the associated rule may contain replacement fields to be inserted into the received metadata if it matches the criteria. The criteria may relate to any characteristics of the metadata, such as its metadata format, type, provider or the content it relates to. As another example, the criteria may list a particular title that is non-standardized or shortened, but that providers of metadata frequently list in the standardized title field of the metadata, while the rule is the correct title that ought to be found in this field. As a third example, if the criteria indicates that a title found in the metadata is improperly formatted, the corresponding rule may direct metadata pre-processor 1202 to retrieve the name of the content provider from the metadata, and to request the full title of the content from a server or website associated with the content provider.

The criteria may also be a reasonable range of values of a field, and, if the content of a field falls outside of this range, the field needs to be modified according to the corresponding rule. The criteria may also require specific fields to be found within the metadata, with the rule providing fields that are to be inserted by metadata pre-processor 1202 if those fields are missing. The fields inserted according to the rule may already be properly populated, or metadata pre-processor 1202 may populate these fields itself.

Correction rules database 1212 may be populated in a number of ways. The rules and/or criteria may be submitted by an editor, a person associated with the media guidance data source, or a user, a person utilizing the user equipment device. The two components of correction rules database 1212, rules and criteria, may also be received separately. For example, the media guidance application may contain a feature that allows users to flag program guide listings as erroneous or program guide features as not functioning. Information regarding flagged metadata may then be sent by the system to an editor that enters a rule for correcting the metadata. Here, information regarding the flagged metadata may serve as the criteria, while the editor entered correction may be the rule. Upon receiving the flagged metadata, the editor may also enter or edit the criteria.

Either criteria or rule may also be automatically generated. When metadata pre-processor 1202 determines that metadata is incorrectly formatted using any approach described in this application, the system may forward information regarding the improperly formatted metadata to the editor to allow the editor to submit a rule for modifying the metadata. Alternatively, a user may flag metadata as improperly formatted, with metadata pre-processor 1202 then automatically modifying the metadata using any approach described in this application. Also, both the criteria and the rule may be automatically generated using any approach discussed in this application.

Regardless of the approach used to make the determination and to modify the metadata, new criteria and rules may be generated and stored in correction rules database 1212 when metadata is determined to be improperly formatted or when it is modified. This is beneficial when other approaches for determining whether metadata is properly formatted and for modifying metadata are more complicated and computationally taxing than using correction rules database 1212. Metadata pre-processor 1202 and environment 1200 may thus learn from previously corrected metadata how to correct metadata received in the future. Correction rules database may also be shared between any number of metadata pre-processors, thereby leveraging newly entered criteria and rules amongst them to help ensure properly formatted metadata.

While each component in environment 1200 of metadata pre-processor 1202 may be useful both for determining if the metadata is properly formatted, and for modifying the metadata if it is not, the same component need not be used for both steps. For example, metadata pre-processor 1202 may utilize metadata standards database 1208 to determine whether the received metadata is properly formatted, but may use media content source website 1206 to retrieve further information to modify improperly formatted metadata. Furthermore, each component may be accessed as a remote source of information, or relevant information from any component in environment 1200 may first be downloaded to a local database, such as metadata database 1214.

Figure 13:
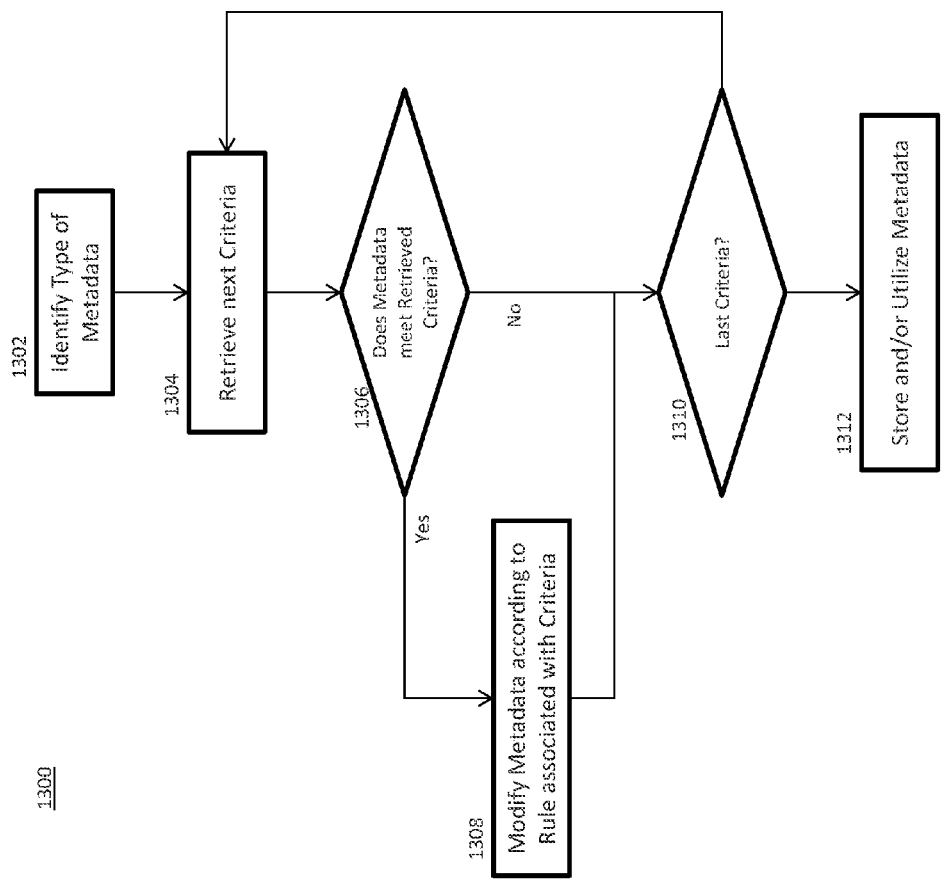
FIG. 13 is an illustrative flow chart of a first process for modifying metadata in accordance with some embodiments of the invention.

FIG. 13 shows a flow chart of process 1300 for determining if metadata is properly formatted, and modifying metadata if it is determined that the metadata is not properly formatted. As such, process 1300 shows in greater detail one possible implementation of steps introduced in process 1100. Process 1300 may be executed by metadata pre-processor 1202 using information obtained from correction rules database 1212.

At step 1302, metadata pre-processor may determine what the type of the metadata to be processed is. This determination may be done by reading a field of the metadata, such as field 630 of metadata 690, or by comparing the metadata against entries found in metadata standards database 1208. Metadata pre-processor 1202 may also determine for which process the metadata will be utilized. These determinations may be used to retrieve appropriate criteria, to limit the breadth of criteria retrieved to a subset related to the type of the metadata or process, and to inform process 1300 how the associated rules are to be applied. For example, if the metadata contains a program guide listing, metadata pre-processor 1202 may not need to consider criteria regarding screen formats when pre-processing the metadata. As another example, correction rules database may have a separate set of criteria for each process that utilizes the metadata, each of which may have its own process specific formatting requirements.

At step 1304 metadata pre-processor 1202 may retrieve the next criteria from correction rules database 1212. The criteria may be values for individual fields, phrases to be searched for throughout the metadata, or even Boolean expressions.

At step 1306 metadata pre-processor 1202 may match the retrieved criteria against the metadata to determine whether the metadata matches the criteria. This may involve checking if a field of the metadata specified by the criteria has a value that is also specified by the criteria. For example, if field 610 lists a particular provider and/or field 628 associates the metadata with specific content, metadata pre-processor 1202 may determine that the metadata is improperly formatted. As another example, the criteria may be that a common non-standardized spelling of the title of a program is found in field 636. The determination can also be made by searching throughout the metadata for a particular phrase specified by the criteria. For example, if any field of the metadata contains the phrase "episode name:", metadata pre-processor may determine that information regarding an episode name is found in the wrong field. Also, if the criteria is a Boolean expression, the Boolean expression may contain locations that fields or other components of the metadata are to be inserted into. This Boolean expression may then be evaluated to determine whether the metadata matches the criteria.

If metadata pre-processor 1202 determines at step 1306 that the metadata is improperly formatted, metadata pre-processor 1202 may modify the metadata at step 1308 according to one or more rules associated with the matching criteria. These rules may result in individual tags or fields being modified or added, and even in the entire metadata being replaced. The rule retrieved from correction rules database 1212 may contain the replacement/additional tag, field or metadata, or may contain a link to where this information may be found. For example, if a criteria specifies that the content of a field of the metadata is improperly located in another field, the rule may specify that this content is to be moved to the correct field. As another example, if the criteria specifies a particular type of metadata for a particular content, the rule may be that replacement metadata is to be retrieved from another location, such as website. In this case, the rule may contain a link to the website that the replacement metadata can be downloaded from. In a third example, if the criteria determines that field 636 does not contain the full title of the content as required by a process specific format, the rule may instruct metadata pre-processor 1202 to communicate with the provider listed in field 610 and request this title.

At step 1310 metadata pre-processor determines whether the criteria matched with the metadata at step 1306 is the last criteria. This can be the last criteria associated with the identified metadata type or the last criteria overall. A rule applied at step 1308 may also specify that no further criteria are to be matched, in which case the current criteria is also the last criteria.

If, at step 1310, metadata pre-processor 1202 determines that further criteria remain, metadata pre-processor may retrieve the next criteria from correction rules database 1212. Otherwise, metadata pre-processor 1202 may complete the determination/modification process and either store or utilize the metadata at step 1312. If any modifications occurred, metadata pre-processor 1202 may modify or store the modified metadata. If the metadata was not modified, metadata pre-processor 1202 may store or utilize the original metadata.

While process 1300 has been described as occurring at metadata pre-processor, one or more of the steps involved may occur at correction rules data 1212. For example, metadata pre-processor 1202 may only retrieve the criteria, and, if it determines that the metadata matches one or more criteria, may send a request containing the metadata or a link thereto to correction rules database 1212 to apply the rules. In this example, correction rules database 1212 may respond with properly formatted metadata. Metadata pre-processor may also send the metadata or a link thereto to correction rules database 1212 without matching the metadata against criteria, and have correction rules database 1212 perform both the matching and applying of associated rules.

Some of the rules described in this application may be implemented by storing information identifying one or more functions in correction rules database 1212. For example, when a criteria is met, metadata pre-processor 1202 may retrieve a pointer to a function that is associated with the criteria, and call this function to modify the improperly formatted metadata. Correction rules database 1212 may also associate input parameters with the criteria, in which case metadata pre-processor may retrieve these parameters from corrections rules database 1212 when a criteria is met and use these parameters to call a function or perform the modification.

Figure 14:
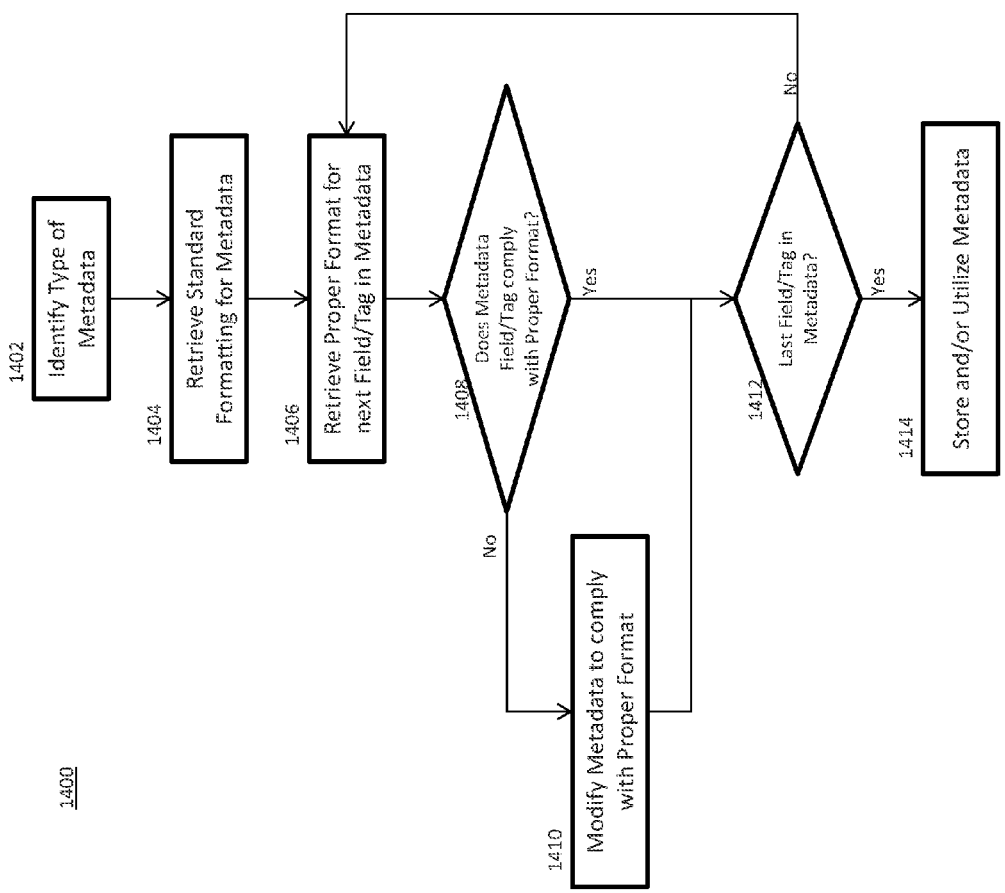
FIG. 14 is an illustrative flow chart of a second process for modifying metadata in accordance with some embodiments of the invention.

FIG. 14 shows a flow chart of another process, process 1400, for determining if metadata is properly formatted, and modifying metadata if it is determined that the metadata is not properly formatted. Similar to process 1300, process 1400 also shows in greater detail one possible implementation of steps introduced in process 1100. Process 1400 may be executed by metadata pre-processor 1202 using information obtained from metadata standards database 1208.

Similar to process 1300, at step 1402 metadata pre-processor 1202 may identify a type for the metadata. At step 1404, metadata pre-processor 1202 may retrieve the metadata format from field 632 of the metadata. Metadata pre-processor 1202 may also retrieve all potential metadata formats that can be associated with the identified metadata type and correlate each against the metadata to determine the format of the metadata. This may be done when field 632 in the metadata may itself be improperly formatted or contain the wrong format, or when the metadata appears to be in the wrong format. For example, metadata pre-processor 1202 may identify the metadata format initially based on field 632, and then correlate the metadata against information found in format standards database 1208 to determine if it is a good match. If it is not, metadata pre-processor 1202 may correlate the metadata against further metadata formats to determine the correct metadata format. Furthermore, the order for establishing metadata type and format may be switched, and techniques used to identify one or confirm its identity may also be applied to the other.

Once the format and type of the metadata have been established, at step 1406 metadata pre-processor 1202 retries information regarding the format of the first field or tag from metadata standards database. This format may be the format specified by the metadata format or a process specific format. For example, metadata pre-processor 1202 may match the name of a tag or field against potential candidates found in metadata standards database 1208. If a match is made, the proper format for this tag or field, as specified by the metadata format or the process specific format, is retrieved from metadata standards database 1208. In the case of tags, this proper format may specify what fields may be enclosed by the tag or, if no match is found, make a note thereof. In the case of fields, the proper format may specify a maximum size of the content that can be placed in the field, or a set of keywords, one of which the content of the field must match. The proper format may also contain links to other databases. For example, the proper format for a content title may contain a link to a separate list of potential content titles. In this example, a process for retrieving further information regarding content from a database may require that the content title found in the metadata matches one of the entries in this database.

At step 1406 metadata pre-processor 1202 may determine whether the current tag or field matches the retrieved proper format and thus whether the tag or field is properly formatted. In the case of tags, if no equivalent tag was retrieved from metadata standards database 1208, metadata pre-processor may automatically determine that the tag is not properly formatted. In the case of fields, metadata pre-processor 1202 may determine whether the field fails to meets features of the proper format, such as a size requirement, or check whether the content of the field is found in a list of potential field contents.

If metadata pre-processor 1202 determines that the tag or field does not comply with the proper format, metadata pre-processor 1202 may modify the tag or field at step 1410. This may involve finding the closest match for a tag in metadata standards database 1408 and replacing the tag with its closest match. The same can be applied to fields whose content is to be selected from a set of keywords. Alternatively, or in combination, further information may be retrieved from other information sources to supplement information found in a field.

At step 1412 metadata pre-processor 1202 determines whether the last tag or field of the metadata has been processed. If it has not, metadata pre-processor 1202 returns to step 1406 to begin processing the next tag or field. If the last tag or field has been processed, metadata pre-processor proceeds to step 1414, where it utilizes either the modified or un-modified metadata in a manner similar to the one described in relation to the equivalent step of process 1300.

Figure 15:
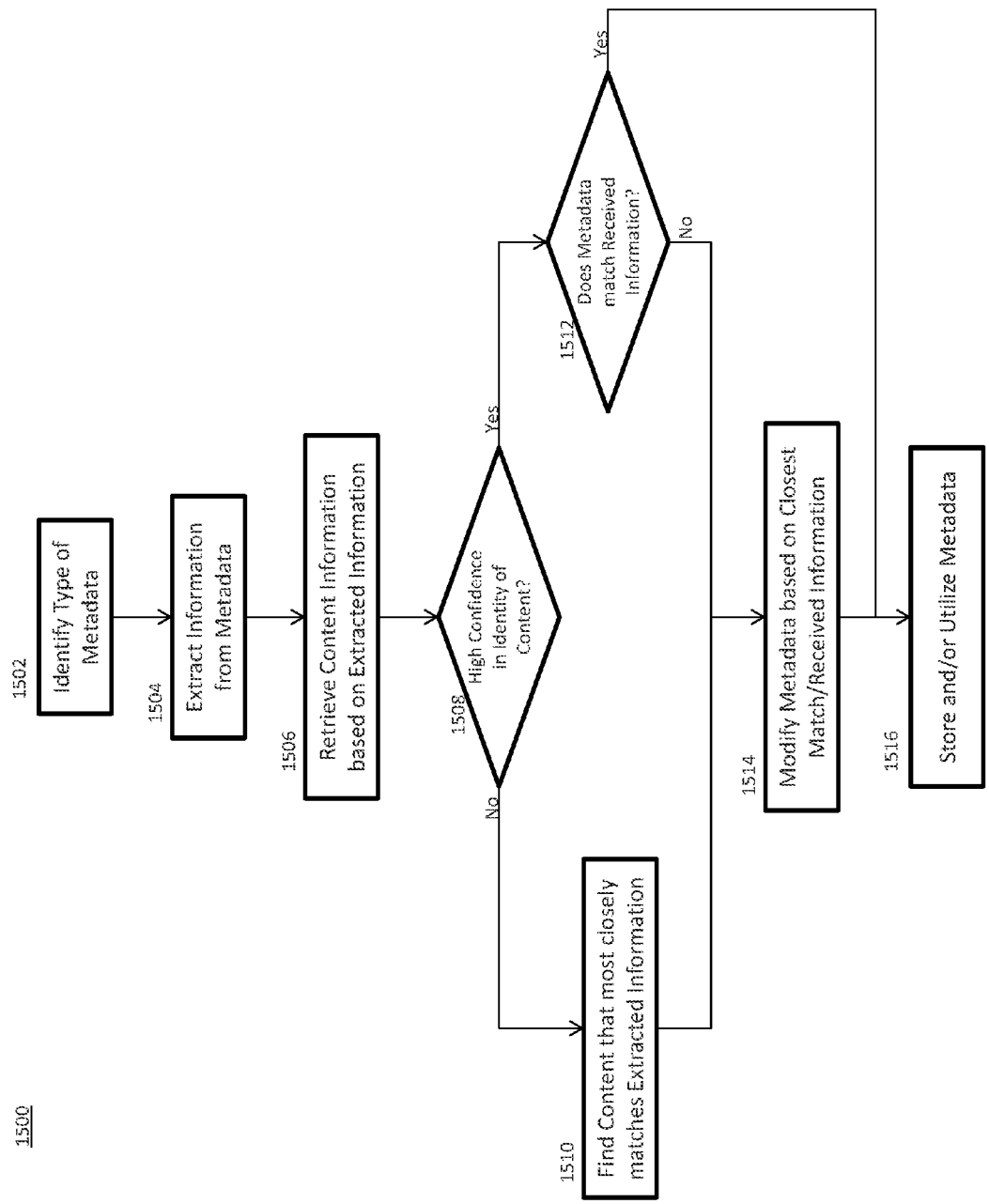
FIG. 15 is an illustrative flow chart of a third process for modifying metadata in accordance with some embodiments of the invention.

FIG. 15 shows a flow chart of another process, process 1500, for determining if metadata is properly formatted, and modifying metadata if it is determined that the metadata is not properly formatted. Similar to processes 1300 and 1400, process 1500 also shows in greater detail one possible implementation of steps introduced in process 1100. Process 1500 may be executed by metadata pre-processor 1202 using information obtained from one or more of information sources 1204, 1206, 1210, 1214, 1216 and 1218. However, for the sake of simplicity, process 1500 will be described as interacting only with media content source 1218.

Similar to process 1300 and 1400, at step 1502 metadata pre-processor 1202 may identify a type and/or format for the metadata. At step 1504 metadata pre-processor 1202 may extract information from the metadata from the metadata based on the identified type and format. At step 1506 metadata pre-processor 1202 may use this extracted information to attempt to identify and retrieve information regarding the content from media content source 1218. For example, metadata pre-processor may generate a query using the content title extracted from field 636 or information extracted from any other fields. This query may also contain information extracted from multiple fields of the metadata. In fact, the query may even contain the entire metadata. In response to the query, media content source 1218 may send metadata pre-processor 1202 content information associated with one or more pieces of content. This response may include content information regarding all pieces of content that match the query, or information on all pieces of content that match the query to a certain degree. Metadata pre-processor 1202 may include wildcards in the query so that multiple pieces of content match the query.

At step 1508 metadata pre-processor 1202 may attempt to match the extracted information, and thus the metadata itself, to content based on the received content information, and determine whether it has a high confidence in having made the correct match. For example, if the metadata pre-processor 1202 transmits a query containing all information extracted from the metadata, and media content source 1218 returns information regarding a single piece of content that exactly matches the extracted information, metadata pre-processor 1202 may determine that the appropriate content has been identified with high confidence. Similarly, if the query returns content information regarding multiple pieces of content, but one of these does a clearly better job matching the extracted information, metadata pre-processor 1202 may determine that the correct content has been located. In these cases, metadata pre-processor 1202 may proceed to step 1512 of process 1500. Conversely, if only bad results are returned or if multiple equally good contenders are located, metadata pre-processor 1202 may determine that no single piece of content has been identified as matching the metadata with high confidence. In that case, metadata pre-processor 1202 may proceed to step 1510 of process 1500. Finally, metadata pre-processor 1202 may receive no information regarding content in response to the search query. In this situation metadata pre-processor 1202 may return to step 1506 and generate a new query, repeat the search using another source of information, or attempt to utilize another process altogether.

If metadata pre-processor 1202 receives multiple equivalent or only poor matches for content, metadata pre-processor 1202 may, at step 1510, determine the closest match for the extracted information from amongst the received content information. This may involve attempting to match fields that were not included in the search query, or applying different weights to the extracted fields. Metadata pre-processor 1202 may also retrieve information from other sources to help determine which content information most closely matches the extracted metadata information.

If metadata pre-processor 1202 is able to identify a clear match of content to extracted metadata information at step 1508, metadata pre-processor 1202 may proceed to step 1512. Here, metadata pre-processor 1202 determines whether the received information exactly matches the information extracted from the metadata. If it is an exact match, metadata pre-processor 1202 may determine that the metadata is properly formatted and that no modifications are necessary. In that case, metadata pre-processor 1202 may proceed to step 1516 to store or utilize the original metadata.

If meta pre-processor 1202 determines at step 1512 that the extracted metadata information does not exactly match the received content information, metadata pre-processor 1202 may proceed to step 1514 to modify the metadata based on the received content information. Similarly, once metadata pre-processor 1202 identifies the closest match content information, metadata pre-processor 1202 may proceed to step 1514 to modify the metadata based on the closest match content information.

Regardless of whether received content information or closest match content information is used, metadata pre-processor 1202 may modify metadata at step 1514 to reflect this information. This may include modifying or adding fields to metadata to mirror this information. At step 1516 metadata pre-processor 1202 then stores or utilizes the modified metadata.

In one exemplary implementation of process 1500, metadata pre-processor 1202 may retrieve the name of the content or metadata provider from field 610, and the content title from field 636. Metadata pre-processor 1202 may then identify a remote server based on information retrieved from field 610, and send a request to the remote server containing the content title retrieved from field 636. The remote server may respond to confirm that this title is indeed the full title for the content, or may supply the full title. If the remote server is unable to identify the full title, it may respond with a list of potential full titles, in which case metadata pre-processor 1202 may select the closest match. Alternatively, or in combination, if the remote server is unable to identify the full title, metadata pre-processor 1202 may communicate with other remote servers and/or use information found in other fields of the metadata to narrow down and select the closest matching full title for the content. Metadata pre-processor 1202 or another feature may then utilize the full title received from the remote server or the closest matching full title instead of the title retrieved from field 636.

Metadata pre-processor 1202 may determine which of processes 1300, 1400 and 1500 to utilize based on the type of the metadata. For example, program guide listings may be pre-processed using one process, while information on media files may be pre-processed using another process. These processes may be used in any combination, including using multiple processes to pre-process the same metadata. Furthermore, processes 1300, 1400 and 1500 can be combined in any manner. For example, any one of the three processes may be used to determine whether metadata is properly formatted, while another process may be used to modify the metadata if it is improperly formatted.

Also, one or more steps of processes 1100, 1300, 1400 and 1500 may be skipped or replaced. For example, instead of first determining whether metadata is improperly formatted, metadata pre-processor 1202 may directly modify the metadata. It could, for example, replace fields found in the metadata without first checking whether or not these fields are properly formatted. In that case the steps associated with determining whether metadata is properly formatted may be skipped or replaced.

It will be apparent to those of ordinary skill in the art that the systems and methods involved in the present application may be embodied in a computer program product that includes a computer usable, non-transitory, and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the implementations describe herein. Those skilled in the art will appreciate that aspects of the application can be practiced by other than the described implementations, which are presented for purposes of illustration rather than of limitation, and the aspects are limited only by the claims which follow.

What is claimed is:

1. A method for operating on improperly formatted metadata associated with content, the metadata comprising a plurality of fields, the method comprising:
   receiving the metadata from a first remote source, wherein the metadata comprises information about the content in a first field of the plurality of fields;
   selecting a field of the plurality of fields based on information received from a second remote source and the information about the content;
   determining, using control circuitry, that the received metadata is improperly formatted if the first field is different from the selected field;
   responsive to determining that the received metadata is improperly formatted, modifying the received metadata to correct the improper formatting; and
   utilizing the modified metadata to identify the information associated with the content.

2. The method of claim 1, wherein:
   the received metadata comprises a program guide listing for the content; and
   modifying the received metadata comprises modifying the program guide listing.

3. The method of claim 2, wherein determining that the metadata is improperly formatted comprises:
   comparing information extracted from the received metadata with information received from the second remote source; and
   determining that the received metadata is improperly formatted if the information extracted from the metadata is located in a field that differs from the field comprising the information received from the second remote source.

4. The method of claim 2, wherein utilizing the modified metadata comprises generating a program guide for display, and wherein the program guide comprises the modified program guide listing.

5. The method of claim 1, wherein modifying the received metadata comprises modifying a received title of the content to conform to a standardized title of the content.

6. The method of claim 1, wherein:
   the method further comprises cross-referencing an identifier of the metadata with a database to identify a proper format for the metadata; and
   determining that the received metadata is improperly formatted comprises determining whether the received metadata complies with the proper format.

7. The method of claim 1, wherein:
   the received metadata comprises incomplete data; and
   modifying the received metadata comprises adding information to supplement the incomplete data.

8. The method of claim 1, wherein modifying the received metadata comprises:
   moving the information about the content from the first field to the selected field to correct the improper formatting.

9. The method of claim 1, wherein determining that the received metadata is improperly formatted comprises:
   matching the metadata against a plurality of criteria; and
   determining that the received metadata is improperly formatted if the metadata matches a criterion of the plurality of criteria.

10. The method of claim 1, wherein:
    the second remote source is a remote database comprising a plurality of rules; and
    modifying the received metadata comprises applying at least one of the plurality of rules to the received metadata.

11. A system for operating on improperly formatted metadata associated with content, the metadata comprising a plurality of fields, the system comprising a processor configured to:
    receive the metadata from a first remote source, wherein the metadata comprises information about the content in a first field of the plurality of fields;
    select a field of the plurality of fields based on information received from a second remote source and the information about the content;
    determine that the received metadata is improperly formatted if the first field is different from the selected field;
    responsive to determining that the received metadata is improperly formatted, modify the received metadata to correct the improper formatting; and
    utilize the modified metadata to identify the information associated with the content.

12. The system of claim 11, wherein:
    the received metadata comprises a program guide listing for the content; and
    modifying the received metadata comprises modifying the program guide listing.

13. The system of claim 12, wherein the processor determines that the received metadata is improperly formatted by being further configured to:
    compare information extracted from the received metadata with information received from the second remote source; and
    determine that the received metadata is improperly formatted if the information extracted from the received metadata is located in a field that differs from the field comprising the information received from the second remote source.

14. The system of claim 12, wherein the processor utilizes the modified metadata by being further configured to generate a program guide for display, and wherein the program guide comprises the modified program guide listing.

15. The system of claim 11, wherein the processor modifies the received metadata by being further configured to modify a received title of the content to conform to a standardized title of the content.

16. The system of claim 11, wherein:
the processor is further configured to cross-reference an identifier of the metadata with a database to identify a proper format for the metadata; and
the processor determines that the received metadata is improperly formatted by being further configured to determine whether the received metadata complies with the proper format.

17. The system of claim 11, wherein:
the received metadata comprises incomplete data; and
the processor modifies the received metadata by being further configured to add information to supplement the incomplete data.

18. The system of claim 11, wherein the processor modifies the received metadata by being further configured to:
move the information about the content from the first field to the selected field to correct the improper formatting.

19. The system of claim 11, wherein the processor determines that the received metadata is improperly formatted by being further configured to:
match the metadata against a plurality of criteria; and
determine that the received metadata is improperly formatted if the metadata matches a criterion of the plurality of criteria.

20. The system of claim 11, wherein:
the second remote source is a remote database comprising a plurality of rules; and
the processor modifies the received metadata by being further configured to apply at least one of the plurality of rules to the received metadata.

21. The method of claim 1, wherein determining that the received metadata is improperly formatted comprises:
determining whether the received metadata fails to comply with at least one of a metadata format and a process-specific format.

22. The method of claim 1, wherein determining that the received metadata is improperly formatted comprises:
determining whether the received metadata lacks information in one or more of the plurality of fields.

23. The method of claim 1, wherein determining that the received metadata is improperly formatted comprises:
determining whether the received metadata includes information that results in a program guide listing containing at least one of an improperly formatted display, a missing feature, and inaccessible content.

24. The method of claim 1, wherein determining that the received metadata is improperly formatted comprises:
determining whether the received metadata includes information that fails to comply with a format of a search process.

25. The system of claim 11, wherein the processor is further configured to:
determine whether the received metadata fails to comply with at least one of a metadata format and a process-specific format.

26. The system of claim 11, wherein the processor is further configured to:
determine whether the received metadata lacks information in one or more of the plurality of fields.

27. The system of claim 11, wherein the processor is further configured to:
determine whether the received metadata includes information that results in a program guide listing containing at least one of an improperly formatted display, a missing feature, and inaccessible content.

28. The system of claim 11, wherein the processor is further configured to:
determine whether the received metadata includes information that fails to comply with a format of a search process.

* * * * *